United States Patent
Sharma

(10) Patent No.: US 10,015,200 B2
(45) Date of Patent: *Jul. 3, 2018

(54) COMMUNICATION WITH ACCESSORIES

(71) Applicant: Idaax Technologies Private Limited, Bengaluru (IN)

(72) Inventor: Vishnu Sharma, Bhubaneswar (IN)

(73) Assignee: Idaax Technologies Private Limited, Bengaluru (IN)

( * ) Notice: Subject to any disclaimer, the term of this patent is extended or adjusted under 35 U.S.C. 154(b) by 98 days.

This patent is subject to a terminal disclaimer.

(21) Appl. No.: 14/975,657

(22) Filed: Dec. 18, 2015

(65) Prior Publication Data

US 2016/0105465 A1 Apr. 14, 2016

Related U.S. Application Data

(63) Continuation of application No. 14/135,927, filed on Dec. 20, 2013, now Pat. No. 9,251,109.

(51) Int. Cl.
| | |
|---|---|
| *G06F 3/00* | (2006.01) |
| *G06F 13/38* | (2006.01) |
| *G06F 15/173* | (2006.01) |
| *H04L 29/06* | (2006.01) |
| *G06F 13/10* | (2006.01) |

(Continued)

(52) U.S. Cl.
CPC ........ *H04L 65/1003* (2013.01); *G06F 3/0481* (2013.01); *G06F 13/10* (2013.01); *G06F 13/385* (2013.01); *G06F 13/4068* (2013.01); *H04L 41/0816* (2013.01); *H04L 65/40* (2013.01)

(58) Field of Classification Search
None
See application file for complete search history.

(56) References Cited

U.S. PATENT DOCUMENTS

| | | |
|---|---|---|
| 6,614,206 B1 | 9/2003 | Wong et al. |
| 7,549,008 B2 | 6/2009 | Kalayjian |

(Continued)

FOREIGN PATENT DOCUMENTS

| | | |
|---|---|---|
| EP | 2230605 | 9/2010 |
| WO | 2000000900 | 1/2000 |
| WO | 2001004764 | 1/2001 |

OTHER PUBLICATIONS

"Accessory Development Kit 2011 Guide," http://developer.android.com/tools/adk/adk.html, 9 pages, accessed on Dec. 10, 2013.

(Continued)

*Primary Examiner* — Michael Sun

(57) ABSTRACT

A plurality of connections may be established between an accessory interface and a plurality of accessories. A connection between the accessory interface and a portable electronic device may also be established. A first set of messages may be communicated via the accessory interface between the portable electronic device and a first accessory of the plurality of accessories. A second set of messages may be communicated via the accessory interface between the portable electronic device and a second accessory of the plurality of accessories. The first and second sets of messages communicated between the portable electronic device and the accessory interface may be formatted in accordance with a data exchange pattern.

31 Claims, 7 Drawing Sheets

(51) Int. Cl.
*G06F 13/40* (2006.01)
*G06F 3/0481* (2013.01)
*H04L 12/24* (2006.01)

(56) References Cited

U.S. PATENT DOCUMENTS

| | | | | |
|---|---|---|---|---|
| 7,756,129 | B2* | 7/2010 | Donaghey | H04L 12/66 370/252 |
| 8,341,318 | B2* | 12/2012 | Holden | G06F 13/385 709/227 |
| 8,402,145 | B2 | 3/2013 | Holden et al. | |
| 8,554,924 | B2 | 10/2013 | Holden et al. | |
| 2003/0078965 | A1 | 4/2003 | Cocotis et al. | |
| 2004/0117513 | A1 | 6/2004 | Scott | |
| 2007/0169080 | A1 | 7/2007 | Friedman | |
| 2008/0320190 | A1* | 12/2008 | Lydon | G06F 13/387 710/106 |
| 2010/0069035 | A1* | 3/2010 | Johnson | H04W 4/02 455/404.1 |
| 2011/0167176 | A1 | 7/2011 | Yew et al. | |
| 2011/0179405 | A1* | 7/2011 | Dicks | G06F 8/61 717/168 |
| 2013/0212165 | A1 | 8/2013 | Vermeulen et al. | |
| 2013/0315235 | A1* | 11/2013 | Foo | H04L 67/06 370/389 |
| 2013/0332172 | A1* | 12/2013 | Prakash | H04M 1/6075 704/270.1 |
| 2014/0307723 | A1 | 10/2014 | Donaghey | |

OTHER PUBLICATIONS

"Accessory Development Kit 2012 Guide," http://developer.android.com/tools/adk/adk2.html, 9 pages, accessed on Dec. 10, 2013.
Accessory Development Kit, http://developer.android.com/tools/adk/index.html, 1 page, accessed on Dec. 10, 2013.
"Android Open Accessory Protocol," http://source.android.cm/accessories/protocol.html, http://source.android.com/accessories/aoa2.html, http://source.android.com/accessories/aoa.html, http://source.android.com/accessories/audio.html, http://source.android.com/accessories/custom.html, 12 pages, accessed on Dec. 10, 2013.
Apple Accessory Protocol, https://nuxx.net/wiki/Apple_Accessory_Protocol, 8 pages, accessed on Dec. 10, 2013.
Extended European Search Report dated May 15, 2015 in European Patent Application No. 14194377.9, 8 pages.
"External Accessory Framework Reference," https://developer.apple.com/library/ios/documentation/ExternalAccessory/Reference/ExternalAccessoryFrameworkReference/ExternalAccessoryFrameworkReference.pdf, 28 pages, May 11, 2010.
U.S. Notice of Allowance, U.S. Appl. No. 14/135,927, dated Aug. 17, 2015.
U.S. Notice of Allowance, U.S. Appl. No. 14/135,927, dated Nov. 3, 2015.
U.S. Office Action, U.S. Appl. No. 14/135,927, dated Apr. 21, 2015.

* cited by examiner

| Initial Portion 310 | Command/ Response Type 320 | Channel Identifier 330 | Command Metadata 340 | Data 350 | Data Length 360 | Data Integrity Value 370 | Final Portion 380 |
|---|---|---|---|---|---|---|---|

COMMUNICATION WITH ACCESSORIES

RELATED APPLICATIONS

The present application is a continuation of U.S. patent application Ser. No. 14/135,927, filed Dec. 20, 2013, entitled "COMMUNICATION WITH ACCESSORIES," naming Vishnu Sharma as the inventor. That application is incorporated herein by reference in its entirety and for all purposes.

BACKGROUND

As portable electronic devices continue to gain popularity, the number of accessories for use with portable electronic devices is increasing. Each accessory typically connects directly to a portable electronic device using a USB wired connection, Bluetooth® wireless connection, or a Near Field Communication (NFC) wireless connection. Once connected, an application running on the portable electronic device may interact with the accessory.

To assist application developers and accessory manufacturers, portable electronic device manufacturers such as Apple and Google have developed communication protocols. For example, Google's "Open Accessory Protocol" or Apple's "Apple Accessory Protocol" may be used to allow communication between a portable electronic device and a connected accessory.

Although these protocols define high-level communication parameters, they do not specify a standard structure or format for messages sent between a portable electronic device and accessories. It is therefore difficult and tedious to implement communication between a portable electronic device and one or more accessories.

SUMMARY

Embodiments disclosed herein are directed to communication of information.

In one embodiment, a method of communicating information may include establishing a plurality of connections between an accessory interface and a plurality of accessories, wherein each connection of the plurality of connections corresponds to a respective accessory of the plurality of accessories. A connection between the accessory interface and a portable electronic device may be established, wherein the accessory interface is separate from the portable electronic device. A first set of messages may be communicated, via the accessory interface, between the portable electronic device and a first accessory of the plurality of accessories, wherein the communicating the first set of messages further comprises determining that the first set of messages corresponds to the first accessory based on first information encoded in the first set of messages, wherein each message of the first set of messages communicated between the portable electronic device and the accessory interface is formatted in accordance with a first data exchange pattern, wherein each message of the first set of messages communicated between the accessory interface and the first accessory is formatted in accordance with a second data exchange pattern, and wherein the first data exchange pattern and the second data exchange pattern are different. A second set of messages may be communicated, via the accessory interface, between the portable electronic device and a second accessory of the plurality of accessories, wherein the communicating the second set of messages further comprises determining that the second set of messages corresponds to the second accessory based on second information encoded in the second set of messages, and wherein each message of the second set of messages communicated between the portable electronic device and the accessory interface is formatted in accordance with the first data exchange pattern.

In another embodiment, an accessory interface may include a first communication interface configured to establish a connection with a portable electronic device, wherein the first communication interface is further configured to receive, from the portable electronic device, a first message and a second message. The accessory interface may also include a second communication interface configured to establish a plurality of connections with a plurality of accessories, wherein each connection of the plurality of connections corresponds to a respective accessory of the plurality of accessories. The accessory interface may further include a processor configured to: access, from the first communication interface, the first and second messages formatted in accordance with a first data exchange pattern; responsive to a first determination that a first accessory of the plurality of accessories corresponds to the first message, provide the first message formatted in accordance with a second data exchange pattern to the second communication interface for communication to the first accessory, wherein the first data exchange pattern and the second data exchange pattern are different; and responsive to a second determination that a second accessory of the plurality of accessories corresponds to the second message, provide the second message to the second communication interface for communication to the second accessory.

In yet another embodiment, a system may include a portable electronic device and an accessory interface. The accessory interface may be separate from the portable electronic device. The accessory interface may include a first communication interface configured to establish a connection with the portable electronic device, wherein the first communication interface is further configured to receive, from the portable electronic device, a first message and a second message. The accessory interface may also include a second communication interface configured to establish a plurality of connections with a plurality of accessories, wherein each connection of the plurality of connections corresponds to a respective accessory of the plurality of accessories. The accessory interface may further include a processor configured to: access, from the first communication interface, the first and second messages formatted in accordance with a first data exchange pattern; responsive to a first determination that a first accessory of the plurality of accessories corresponds to the first message, provide the first message formatted in accordance with a second data exchange pattern to the second communication interface for communication to the first accessory, wherein the first data exchange pattern and the second data exchange pattern are different; and responsive to a second determination that a second accessory of the plurality of accessories corresponds to the second message, provide the second message to the second communication interface for communication to the second accessory.

BRIEF DESCRIPTION OF THE DRAWINGS

The present invention is illustrated by way of example, and not by way of limitation, in the figures of the accompanying drawings and in which like reference numerals refer to the same or similar elements.

FIG. 3 shows a message in accordance with one embodiment.

DETAILED DESCRIPTION OF THE INVENTION

Figure 1:
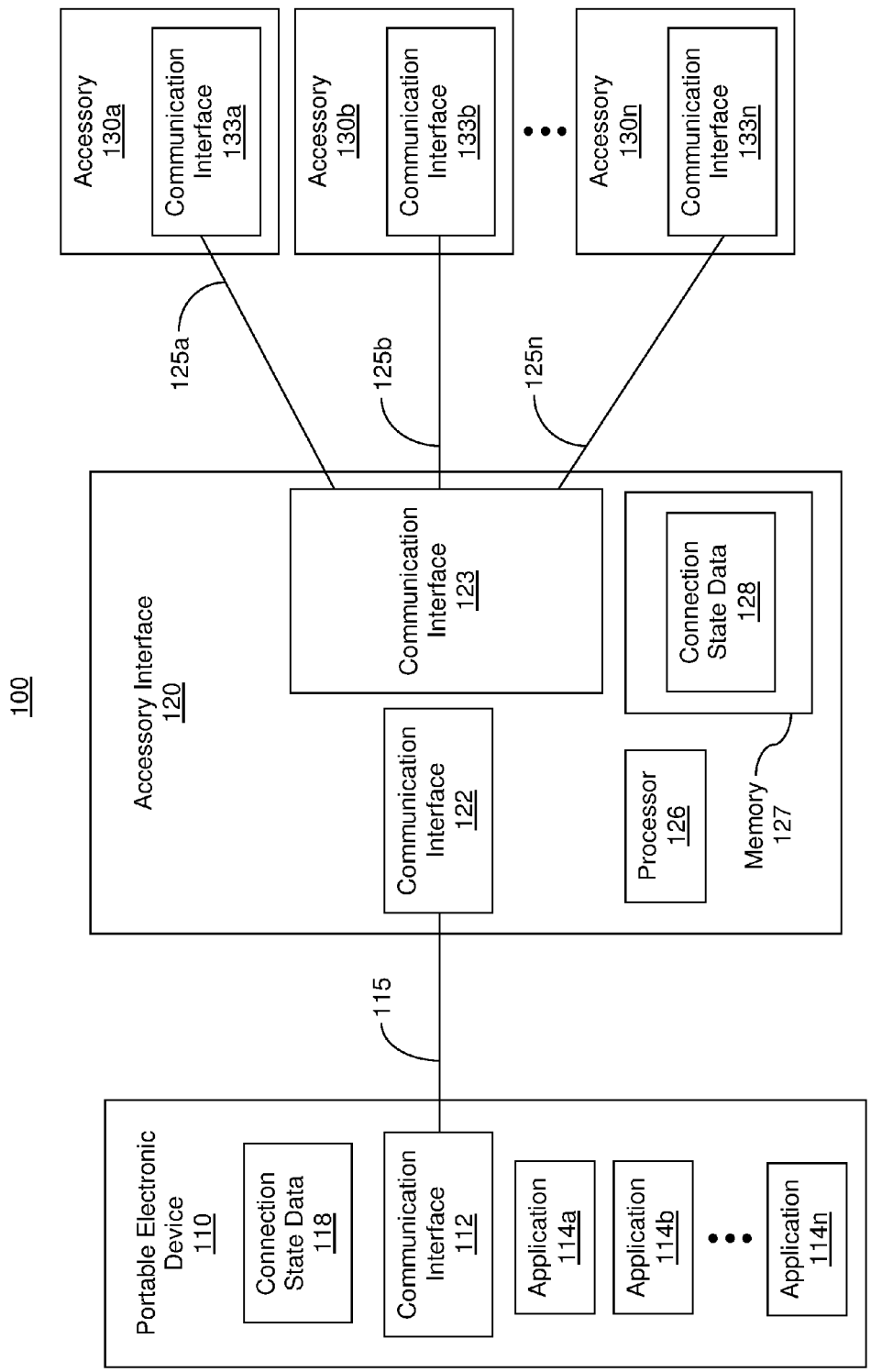
FIG. 1 shows a system for communicating information in accordance with one embodiment.

Reference will now be made in detail to embodiments of the present invention, examples of which are illustrated in the accompanying drawings. While the present invention will be discussed in conjunction with the following embodiments, it will be understood that they are not intended to limit the present invention to these embodiments alone. On the contrary, the present invention is intended to cover alternatives, modifications, and equivalents which may be included with the spirit and scope of the present invention as defined by the appended claims. Furthermore, in the following detailed description of the present invention, numerous specific details are set forth in order to provide a thorough understanding of the present invention. However, embodiments of the present invention may be practiced without these specific details. In other instances, well-known methods, procedures, components, and circuits have not been described in detail so as not to unnecessarily obscure aspects of the present invention.

Notation and Nomenclature

Some regions of the detailed descriptions which follow are presented in terms of procedures, logic blocks, processing and other symbolic representations of operations on data bits within a computer memory. These descriptions and representations are the means used by those skilled in the art to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing the terms such as "aborting," "accepting," "accessing," "activating," "adding," "adjusting," "allocating," "allowing," "analyzing," "applying," "assembling," "assigning," "authenticating," "authorizing," "balancing," "blocking," "calculating," "capturing," "causing," "changing," "charging," "combining," "comparing," "collecting," "communicating," "configuring," "controlling," "converting," "creating," "deactivating," "debugging," "decreasing," "defining," "delivering," "depicting," "detecting," "determining," "discharging," "displaying," "downloading," "enabling," "establishing," "executing," "forwarding," "flipping," "generating," "grouping," "hiding," "identifying," "increasing," "initiating," "instantiating," "interacting," "measuring," "modifying," "monitoring," "moving," "outputting," "parsing," "performing," "placing," "presenting," "processing," "programming," "providing," "provisioning," "querying," "receiving," "reformatting," "regulating," "removing," "rendering," "repeating," "resuming," "retaining," "sampling," "simulating," "selecting," "sending," "sorting," "storing," "subtracting," "suspending," "tracking," "transcoding," "transforming," "transmitting," "unblocking," "using," "verifying," or the like, may refer to the action and/or processes of a computer system, or similar electronic computing device, that manipulates and transforms data represented as physical (electronic) quantities within the computer system's registers and memories into other data similarly represented as physical quantities within the computer system memories or registers or other such information storage, transmission and/or display devices.

Embodiments

FIG. 1 shows system 100 for communicating information in accordance with one embodiment. As shown in FIG. 1, accessory interface 120 may communicate with portable electronic device 110 over connection 115, where accessory interface 120 is separate from portable electronic device 110. At least one application (e.g., 114a, 114b, etc.) may be stored on and/or executed by portable electronic device 110. Accessory interface 120 may communicate with at least one accessory (e.g., 130a, 130b, etc.) over at least one connection (e.g., 125a, 125b, etc.). Accordingly, accessory interface 120 may allow communication of messages between an application (e.g., 114a, 114b, etc.) of a portable electronic device (e.g., 110) and at least one accessory (e.g., 130a, 130b, etc.). In one embodiment, each message communicated between an application (e.g., 114a, 114b, etc.) of a portable electronic device (e.g., 110) and at least one accessory (e.g., 130a, 130b, etc.) may be associated with a command (e.g., a request to another device or system to perform at least one operation), a response to a command (e.g., including information about the result of the at least one operation), an exchange of data, or some combination thereof.

Messages may be communicated or routed (e.g., by processor 126 of accessory interface 120) from portable electronic device 110 (or at least one application thereof) to an appropriate accessory (e.g., 130a, 130b, etc.) based on information included or encoded in the messages. For example, a first message or set of messages may be routed to a first accessory (e.g., 130a) based on first information (e.g., associated with the first accessory) encoded in the first message or set of messages, whereas a second message or set of messages may be routed to a second accessory (e.g., 130b) based on second information (e.g., associated with the second accessory) encoded in the second message or set of messages. The information encoded in the messages and used by accessory interface 120 for routing may include at least one channel identifier (e.g., a respective number or other information corresponding to each channel) assigned to a respective accessory in one embodiment.

In one embodiment, connection state data (e.g., 128) stored in a memory (e.g., 127) of accessory interface 120 may be used to route messages. For example, connection state data 128 may include a mapping of at least one channel to at least one accessory, where each channel is assigned or corresponds to a respective accessory. As such, if information accessed or extracted from a message indicates that the message is associated with a particular channel, processor 126 may use connection state data 128 to determine an accessory corresponding to the particular channel. In this manner, the accessory corresponding to the message may be determined, and responsive thereto, the message may be routed to the accessory (e.g. using processor 126).

In addition to relating at least one channel to at least one accessory, connection state data 128 may also provide information about the connection state of one or more accessories in one embodiment. For example, if connection state data 128 includes information assigning a particular accessory to a channel, then it may be determined that the particular accessory is in an active state and/or capable of communicating with accessory interface 120. In one embodiment, an accessory may be capable of communicating with accessory interface 120 after execution of a handshake procedure, after an authentication of the accessory by accessory interface 120 and/or portable electronic device 110, after electrically coupling the accessory to accessory interface 120 via a wired connection or interface, after sending a request to communicatively couple the accessory and accessory interface 120 via a wireless connection or interface, after execution of some other procedure, or some combination thereof. As another example, if connection state data 128 does not include information assigning a particular accessory to a channel or does not include any information about the particular accessory at all, then it may be determined that the particular accessory is in an inactive state and/or not capable of communicating with accessory interface 120.

In one embodiment, connection state data 128 may be updated (e.g., by processor 126) responsive to adding at least one new connection (e.g., 125*a*, 125*b*, etc.) and/or responsive to connection of at least one new accessory (e.g., to accessory interface 120). Connection state data 128 may be updated (e.g., by processor 126) responsive to removing at least one existing connection (e.g., 125*a*, 125*b*, etc.) and/or responsive to disconnection of a previously-connected accessory (e.g., 130*a*, 130*b*, etc.) in one embodiment. In this manner, the current connection state of at least one accessory (e.g., 130*a*, 130*b*, etc.) with respect to accessory interface 120 can be tracked.

As shown in FIG. 1, portable electronic device 110 may access or include connection state data 118. In one embodiment, connection state data 118 may include a mapping of at least one accessory (e.g., connected to accessory interface 120) to at least one channel similar to connection state data 128. Portable electronic device 110 and/or at least one application (e.g., 114*a*, 114*b*, etc.) thereof may use connection state data 118 to encode information (e.g., a channel identifier) into a message to allow communication or routing of the message (e.g., by accessory interface 120) to the appropriate accessory. Responsive to receiving a message from accessory interface 120, connection state data 118 may be used by portable electronic device 110 and/or at least one application (e.g., 114*a*, 114*b*, etc.) thereof to identify an accessory corresponding to the message and/or to route the message to the appropriate application (e.g., that issued a command to the identified accessory, that requested data from the identified accessory, that corresponds to the identified accessory, that corresponds to accessory interface 120, etc.) of portable electronic device 110.

Connection state data 118 may be synchronized with connection state data 128 at one or more times and/or responsive to one or more events. For example, connection state data 118 may be stored or updated responsive to establishing connection 115 between accessory interface 120 and portable electronic device 110, responsive to launching of at least one application (e.g., 114*a*, 114*b*, etc.) on portable electric device 110, responsive to adding at least one new connection (e.g., between accessory interface and at least one additional accessory), responsive to connection of at least one accessory to accessory interface 120, responsive to removing at least one existing connection (e.g., between accessory interface and at least one accessory), responsive to a disconnection of at least one accessory from accessory interface 120, etc. In one embodiment, portable electronic device 110 may issue a command to accessory interface 120 to provide at least a portion of connection state data 128 for creating and/or updating connection state data 118, where accessory interface 120 may thereafter send the requested data to portable electronic device 110 for synchronization thereof. And in one embodiment, accessory interface 120 may send at least a portion of connection state data 128 to portable electronic device 110 (e.g., for synchronizing connection state data 118 with connection state data 128) without a request or prompting from portable electronic device 110, where the data may be sent periodically, at one or more times and/or responsive to one or more events as discussed herein, etc.

Figure 2:
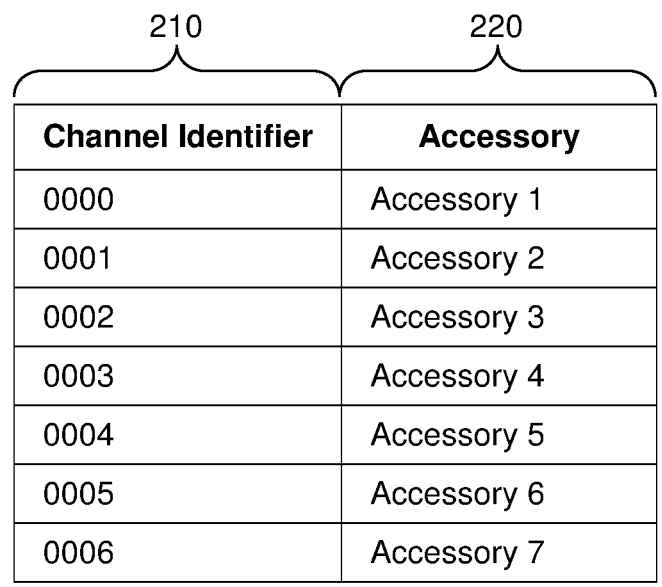
FIG. 2 shows exemplary connection state data in accordance with one embodiment.

FIG. 2 shows exemplary connection state data 200 in accordance with one embodiment. Connection state data 118 and/or connection state data 128 may be implemented in accordance with connection state data 200 in one embodiment.

As shown in FIG. 2, connection state data 200 may include a mapping of at least one accessory (in column 220) to at least one channel identifier (in column 210). In one embodiment, each accessory or accessory identifier (listed or identified in column 220) may be assigned to a respective channel (listed or identified in column 210). Each channel identifier in connection state data 200 may be 4 bits in length in one embodiment.

Connection state data 200 may be implemented as a lookup table, index, database, or other type of data structure. In one embodiment, connection state data 200 may be queried using a channel identifier to return an accessory or identifier of an accessory (e.g., of column 220) that corresponds to the channel identifier. Alternatively, connection state data 200 may be queried using an accessory identifier (e.g., of column 220) to return a channel identifier (e.g., of column 210) that corresponds to the accessory or accessory identifier.

As shown in FIG. 2, connection state data 200 may include information for seven accessories and corresponding channels. In one embodiment, inclusion of information for the seven accessories in connection state data 200 may indicate that the seven accessories are each in an active state and/or capable of communicating with accessory interface 120. An accessory may be capable of communicating with accessory interface 120 after execution of a handshaking procedure, after an authentication of the accessory by accessory interface 120 and/or portable electronic device 110, after electrically connecting the accessory to accessory interface 120 via a wired connection or interface, after execution of some other procedure, or some combination thereof. In one embodiment, exclusion of information for at least one other accessory (e.g., which is not shown in FIG. 2) from connection state data 200 may indicate that the at least one other accessory is in an inactive state and/or not capable of communicating with accessory interface 120.

Although FIG. 2 shows connection state data 200 as including a particular amount of data, it should be appreciated that a different amount of data may be included in connection state data 200 in other embodiments. For example, connection state data may include information for a different number of accessories, a different number of channels, some combination thereof, etc. Additionally, although FIG. 2 shows connection state data 200 as including a particular arrangement and type of data, it should be appreciated that a different arrangement and/or type of data may be included in connection state data 200 in other embodiments. For example, connection state data 200 may include information for both connected and disconnected accessories, where connection state data 200 may include an additional column which indicates a respective connection state (e.g., connected, disconnected, etc.) of each accessory (e.g., of column 220). As another example, other information (e.g., a respective power state of each accessory, a respective connection type for a respective connection between each accessory and accessory interface 120, etc.) may be included in connection state data 200 for one or more accessories in other embodiments.

Turning back to FIG. 1, connection 115 between portable electronic device 110 and accessory interface 120 may be a wired connection in one embodiment. For example, connection 115 may be a USB connection, IEEE 1394 or FireWire® connection, PCI Express® connection, Ethernet connection, SATA connection, eSATA connection, RS-232 connection, I²C connection, GPIO connection, SPI connection, etc. In one embodiment, connection 115 may be a wireless connection such as a Bluetooth® connection, Near Field Communication (NFC) connection, infrared (IR) connection, IEEE 802.XX connection, cellular connection, etc.

Connection 115 may be implemented using communication interface 112 (of portable electronic device 110) and communication interface 122 (of accessory interface 120). Communication interface 112 and communication interface 122 may each include respective hardware and/or respective software allowing connection 115 to be established and allowing communication of at least one message over connection 115. Communication interface 112 and communication interface 122 may also allow unidirectional communication and/or bidirectional communication over connection 115. And in one embodiment, communication interface 112 and communication interface 122 may allow contemporaneous (or simultaneous) bidirectional communication (e.g. "full-duplex" communication) over connection 115.

As shown in FIG. 1, each of the connections (e.g., 125a, 125b, etc.) between at least one accessory (e.g., 130a, 130b, etc.) and accessory interface 120 may be either wired connections (e.g., USB connections, IEEE 1394 or FireWire® connections, PCI Express® connections, Ethernet connections, SATA connections, eSATA connections, RS-232 connections, I²C connections, GPIO connections, SPI connections, etc.) or wireless connections (e.g., Bluetooth® connections, NFC connections, IR connections, IEEE 802.XX connections, cellular connections, etc.). In one embodiment, at least two of the connections (e.g., 125a, 125b, etc.) with accessory interface 120 may be the same type of connection (e.g., wired connections, wireless connections, wired connections of the same type, wireless connections of the same type, etc.). In one embodiment, at least two different types of connections (e.g., at least one wired connection and at least one wireless connection, at least one wired connection of a first type and at least one wired connection of a second type, at least one wireless connection of a first type and at least one wireless connection of a second type, etc.) with accessory interface 120 may contemporaneously or simultaneously exist.

Each of the connections (e.g., 125a, 125b, etc.) between accessory interface 120 and at least one accessory (e.g., 130a, 130b, etc.) may be implemented using communication interface 123 (of accessory interface 120) and a respective communication interface (e.g., 133a, 133b, etc.) of a respective accessory (e.g., 130a, 130b, etc.). Communication interface 123 and a communication interface of an accessory (e.g., communication interface 133a, communication interface 133b, etc.) may each include respective hardware and/or respective software allowing a connection (e.g., 125a, 125b, etc.) to be established and allowing communication of at least one message over the connection (e.g., 125a, 125b, etc.). Communication interface 123 and a communication interface of an accessory (e.g., communication interface 133a, communication interface 133b, etc.) may also allow unidirectional communication and/or bidirectional communication over the connection (e.g., 125a, 125b, etc.). And in one embodiment, communication interface 123 and a communication interface of an accessory (e.g., communication interface 133a, communication interface 133b, etc.) may allow contemporaneous (or simultaneous) bidirectional communication (e.g. "full-duplex" communication) over the connection (e.g., 125a, 125b, etc.).

Each application of portable electronic device 110 (e.g., application 114a, application 114b, etc.) may be a native application installed either by the manufacturer of portable electronic device 110 (e.g., before or after purchase by a user) or by a user of portable electronic device 110. One or more of the applications (e.g., 114a, 114b, etc.) may be associated with accessory interface 120 and/or at least one accessory (e.g., 130a, 130b, etc.) connected to accessory interface 120.

In one embodiment, each of the applications (e.g., 114a, 114b, etc.) may correspond to at least one respective accessory (e.g., 130a, 130b, etc.) connected to accessory interface 120. For example, where accessory 130a includes a motor, application 114a may be an application for controlling the motor. As another example, where accessory 130a includes a light source, application 114a may be an application for turning on and/or off the light source.

Alternatively, more than one of the applications (e.g., 114a, 114b, etc.) may correspond to a particular accessory in one embodiment. For example, where accessory 130a is a headset including a microphone, application 114a may be a phone-related application allowing a user to make a voice call using the microphone while application 114b may be a dictation application that converts speech input via the microphone to text.

FIG. 3 shows message 300 in accordance with one embodiment. Message 300 may be part of a byte stream used for communication between one or more components of system 100 (e.g., portable electronic device 110, accessory interface 120, accessory 130a, accessory 130b, etc.). As shown in FIG. 3, message 300 may include initial portion 310, portion 320 associated with a command type or response type, portion 330 associated with a channel identifier, portion 340 associated with command metadata, portion 350 associated with data, portion 360 associated with a length of portion 350, portion 370 associated with a data integrity value, and final portion 380.

Initial portion 310 may be a value indicating a start of message 300 and/or a start of a byte stream that includes message 300. In one embodiment, initial portion 310 may include a SOH value (e.g., an ASCII value indicating a start of a message header), a SOT value (e.g., an ASCII value indicating a start of text), etc.

In one embodiment, portion 310 may be one byte in length. And in other embodiments, portion 310 may be larger or smaller than one byte in length.

As shown in FIG. 3, portion 320 may be associated with a command type or a response type. Where message 300 is associated with a command, portion 320 may include a command type corresponding to a request to a recipient to perform at least one operation. The recipient may be at least one accessory (e.g., where message 300 is sent from portable electronic device 110 or from accessory interface 120), accessory interface 120 (e.g., where message 300 is sent from portable electronic device 110 or from at least one accessory), or portable electronic device 110 (e.g., where message 300 is sent from at least one accessory or from accessory interface 120). For example, portion 320 may include a "GET" command type associated with a request to get a parameter value from a recipient of message 300, a "SET" command type associated with a request to set a parameter value at a recipient of message 300, a "DOWORK" command type associated with a request for the recipient of message 300 to perform at least one operation (e.g., some work, at least one function, at least one change of state, etc.), a "RESEND" command type associated with a request to resend a parameter value and/or data previously sent from a recipient of message 300, etc.

Alternatively, where message 300 is associated with a response to a command, portion 320 may include a response type corresponding to a response to a request to perform at least one operation. For example, portion 320 may include a response type (e.g., a "RETVAL" response type) associated with a response to a request to perform at least one operation (e.g., a message including a "DOWORK" command type), get a parameter value (e.g., a message including a "GET" command type), set a parameter value (e.g., a message including a "SET" command type), or resend a parameter value and/or data (e.g., a message including a "RESEND" command type).

In one embodiment, portion 320 may be four bits in length. Portion 320 and at least one other portion (e.g., portion 330 associated with a channel identifier, another portion, etc.) may be encoded in a single byte (e.g., as a low nibble and a high nibble) of message 300 in one embodiment. And in other embodiments, portion 320 may be larger or smaller than four bits in length (e.g., depending on the number of possible command types and/or response types).

As shown in FIG. 3, portion 330 may be associated with a channel identifier. The channel identifier may correspond to a channel assigned to an accessory (e.g., 130*a*, 130*b*, etc.), where the accessory may be connected to and/or in communication with accessory interface 120. In one embodiment, the relationship of accessories to assigned channels may be found in connection state data (e.g., 118, 128, 200, etc.), and therefore, the channel identifier included in portion 330 may be used to identify an accessory (e.g., 130*a*, 130*b*, etc.) corresponding to message 300 and/or route message 300 to the corresponding accessory. For example, processor 126 of accessory interface 120 may access a channel identifier from portion 330 and determine that message 300 is associated with an accessory. The association between message 300 and the accessory may be determined using a mapping (e.g., within connection state date 118) of the channel identifier (e.g., included in portion 330) to the accessory. Message 300 may thereafter be communicated or routed to the accessory.

As another example, portable electronic device 110 may access a channel identifier from portion 330 and determine that message 300 is associated with an accessory. The association between message 300 and the accessory may be determined using a mapping (e.g., within connection state date 118) of the channel identifier (e.g., included in portion 330) to the accessory. Portable electronic device 110 may then use the determined association (e.g., between message 300 and the accessory) for proper routing of the message (e.g., to an application of portable electronic device 110 that corresponds to the accessory, to an application of portable electronic device 110 that corresponds to accessory interface 120, etc.).

In one embodiment, portion 330 may be four bits in length. In this case, portion 330 may allow encoding of up to 16 channel identifiers (e.g., corresponding to 16 different accessories where only one accessory is assigned to each channel). Portion 330 and at least one other portion (e.g., portion 320 associated with a command type, another portion, etc.) may be encoded in a single byte (e.g., as a low nibble and a high nibble) of message 300 in one embodiment. And in other embodiments, portion 330 may be larger or smaller than four bits in length (e.g., depending on the number of possible channel identifiers and/or accessories).

As shown in FIG. 3, portion 340 may be associated with command metadata. In one embodiment, portion 340 may include metadata associated with a command type of portion 320. For example, where a command type included in portion 320 is "SET," command metadata included in portion 340 may be "TEMP" (e.g., representing "temperature"). In this case, a command associated with message 300 may be a request to set a temperature at the recipient. As another example, where a command type included in portion 320 is "DOWORK," command metadata included in portion 340 may be "TURN_CLOCKWISE." As such, where a recipient accessory includes a motor, a command associated with message 300 may be a request to turn the motor clockwise.

In one embodiment, portion 340 may include metadata associated with a response type of portion 320 and/or a command type of a previous message (e.g., which message 300 may be a response to). For example, where a response type included in portion 320 is a "RETVAL" response type, command metadata included in portion 340 may be "TURN_CLOCKWISE." As such, where an accessory in communication with the portable electronic device (or an application thereof) includes a motor, message 300 may be a response to a previous message associated with a command to turn the motor clockwise. In one embodiment, the metadata included in portion 340 (e.g., "TURN_CLOCK-WISE") may be the same in both a first message associated with a command and a second message associated with a response to the command.

In one embodiment, portion 340 may be one byte in length. And in other embodiments, portion 340 may be larger or smaller than one byte in length (e.g., depending on the amount of metadata provided in the message).

As shown in FIG. 3, portion 350 may be associated with data. The data included in portion 350 may be any data communicated or exchanged between one or more components of system 100 (e.g., portable electronic device 110, accessory interface 120, accessory 130*a*, accessory 130*b*, etc.). For example, the data included in portion 350 may be information about a component of a device or a system, image data, video data, audio data, tables, other types of data, etc.

Where message 300 is associated with a command (e.g., where portion 320 is associated with a command type such as "GET," "SET," "DOWORK," etc.), data included in portion 350 may be information about at least one operation to be performed by the recipient (e.g., related to the command type associated with portion 320). Alternatively, where message 300 is associated with a response to a command (e.g., where portion 320 is associated with a response type such as a "RETVAL" response type or the like), data included in portion 350 may be information about the result of at least one operation (e.g., whether or not the at least one operation was completed successfully, one or more values associated with performance of the at least one operation, etc.) performed by the recipient (e.g., responsive to a previous message associated with a command). For example, where message 300 is associated with a response (e.g., portion 320 is associated with a response type such as a "RETVAL" response type or the like) to a command to turn a motor clockwise (e.g., associated with a previous message), portion 350 may include information about the result of the attempt to turn the motor clockwise such as whether or not the attempt was successful, a number of degrees and/or direction that the motor was actually turned, etc.

In one embodiment, portion 350 may be four bytes in length. In this case, portion 350 may be advantageously large enough to hold "int" or integer data types yet small enough to be handled by 32-bit processors (e.g., which are relatively inexpensive and readily available). Accordingly, 32-bit processors may be used (e.g. in accessory interface 120, in at least one accessory in communication with an application of portable electronic device 110, some combination thereof, etc.) while also providing the flexibility to use a variety of data types (e.g., "int" or integers, floating-point numbers, Booleans, characters, etc.).

Alternatively, portion 350 may be larger or smaller than four bytes in length in other embodiments. In these cases, the length of portion 350 may depend on the amount and/or data types of the data included in portion 350, the processors or other components configured to process and/or communicate the data (e.g., in accessory interface 120, at least one accessory in communication with an application of portable electronic device 110, some combination thereof, etc.), the length of portion 360 associated with the length of portion 350, another factor, some combination thereof, etc.

In one embodiment, where the size or length of portion 350 is greater than the size of data to communicated in a message, at least a portion of portion 350 may be filled or padded with zeros (or some other known value such as ones). For example, where the size of portion 350 is four bytes and the size of the data to be communicated in a message is only one byte, then the remaining three bytes in the message may be filled or padded with zeros (or some other known value such as ones). Filling or padding with zeros (or some other known value such as ones) may occur before the data to be communicated (in portion 350), after the data to be communicated (in portion 350), or some combination thereof.

As shown in FIG. 3, portion 360 may be associated with a length of portion 350. For example, where portion 350 includes four bytes of data, a value of four may be included in portion 360. As another example, where portion 350 includes eight bytes of data, a value of eight may be included in portion 360.

In one embodiment, portion 360 may be one byte in length. In this case, portion 360 may include a value of anywhere from zero to 255 (e.g., representing a length of portion 350 of anywhere from zero to 255 bytes) for a total of 256 possible values. In one embodiment, portion 360 may have a length of more than one byte (e.g., two bytes, three bytes, etc.). For example, where portion 360 is two bytes in length, portion 360 may include one of 65535 different possible values (e.g., representing 65535 different possible byte lengths of portion 350).

As shown in FIG. 3, portion 370 may be associated with a data integrity value. For example, portion 370 may include a checksum, hash, or other data integrity value associated with message 300 (or a portion thereof such as portion 350 associated with data). The value encoded in portion 370 may allow the recipient to verify the integrity of message 300 (or a portion thereof) and/or perform error correction thereon.

In one embodiment, portion 370 may be one byte in length. And in other embodiments, portion 370 may be larger or smaller than one byte in length.

As shown in FIG. 3, final portion 380 may be a value indicating the end of message 300 and/or the end of a byte stream that includes message 300. In one embodiment, final portion 380 may include an EOT value (e.g., an ASCII value indicating the end of transmission), an ETB value (e.g., an ASCII value indicating the end of transmission block), etc.

In one embodiment, a certain value (e.g., an ETB value) included in final portion 380 may be used to indicate that data of another message (e.g., sent after message 300) is related to data of message 300 (e.g., included in portion 350). For example, where the amount of data to be communicated (e.g., between an application of a portable electronic device and at least one accessory, between an application of a portable electronic device and an accessory interface, between an accessory interface and at least one accessory, etc.) exceeds the size of the data portion (e.g., 350) defined by a data exchange pattern, the data may be partitioned and sent using multiple messages (e.g., message 300 and at least one subsequent message). At least one message including the related data (e.g., all the messages except for the last one) may include a respective value (e.g., an ETB value) in the respective final portion to indicate that a subsequent message includes related data, and the last message of the messages including related data may include a value (e.g., an EOT value) in the final portion to indicate that the message is the last message including related data and/or that the message is the last message in the byte stream.

One or more parameters of message 300 may be dictated or specified by a data exchange pattern. In one embodiment, a data exchange pattern may specify that each message formatted in accordance therewith includes the same respective portions (e.g., 310, 320, 330, 340, 350, 360, 370, 380, at least one other portion, some combination thereof, etc.), the same ordering of respective portions, the same sizes or lengths of one or more respective portions, the same message size, some combination thereof, etc.

In one embodiment, a data exchange pattern may specify that the size of each message communicated in accordance therewith be at most 10 bytes. In this case, the data portion of the message (e.g., portion 350 of message 300) may be four bytes in length, thereby advantageously being large enough to hold "int" or integer data types yet small enough to be handled by 32-bit processors (e.g., which are relatively inexpensive and readily available). Alternatively, a data exchange pattern may specify that the size of each message communicated in accordance therewith be less than 10 bytes (e.g., where a data portion of less than four bytes is used). And in one embodiment, a data exchange pattern may specify that the size of each message communicated in accordance therewith be more than 10 bytes (e.g., where a data portion of more than four bytes is used, where one or more other portions of the messages is larger in size, where a larger number of portions in each message is used, etc.).

It should be appreciated that a data exchange pattern may be independent of a communication protocol (e.g., an application protocol or application communication protocol, an accessory protocol or accessory communication protocol, etc.) and/or connection type used for communication of messages. For example, a communication protocol may specify parameters of communication other than at least one parameter defined or specified by the data exchange pattern, where the at least one parameter defined or specified by the data exchange pattern may include a designation of which portions each message should include, the ordering of the portions, the size or length of each portion, message size, some combination thereof, etc. Accordingly, messages formatted in accordance with the same data exchange pattern may be communicated in accordance with different communication protocols. Similarly, messages formatted in accordance with at least two different data exchange patterns may be communicated in accordance with the same communication protocol.

As another example, messages formatted in accordance with the same data exchange pattern may be communicated across different types of wired connections (e.g., USB connections, IEEE 1394 or FireWire® connections, PCI Express® connections, Ethernet connections, SATA connections, eSATA connections, RS-232 connections, I²C connections, GPIO connections, SPI connections, etc.), different types of wireless connections (e.g., Bluetooth® connections, NFC connections, IR connections, IEEE 802.XX connections, cellular connections, etc.), some combination of wired and wireless connections, etc. And as yet another example, messages formatted in accordance with at least two different data exchange patterns may be communicated across the same type of wired connection (e.g., USB connection, IEEE 1394 or FireWire® connection, PCI Express® connection, Ethernet connection, SATA connection, eSATA connection, RS-232 connection, I²C connection, GPIO connection, SPI connection, etc.) and/or wireless connection (e.g., Bluetooth® connection, NFC connection, IR connection, IEEE 802.XX connection, cellular connection, etc.).

A data exchange pattern may specify how to handle the communication of data which exceeds the size of a data portion of a message (e.g., portion 350 of message 300) in one embodiment. For example, where a data exchange pattern requires that each message communicated in accordance therewith hold at most four bytes of data, transmission of 12 bytes of related data may be performed by partitioning the data into four-byte portions that may be communicated using three separate messages (e.g., each holding a respective four-byte portion of the related data).

In one embodiment, messages communicated between portable electronic device 110 (or at least one application thereof) and accessory interface 120 may be formatted in accordance with the same data exchange pattern regardless of which accessory (e.g., 130a, 130b, etc.) each message is associated with. For example, a first message and a second message may each be communicated between portable electronic device 110 (or at least one application thereof) and accessory interface 120 in accordance with the same data exchange pattern even though each message is associated with a different accessory (e.g., the first message is associated with accessory 130a, the second message is associated with accessory 130b, etc.). A message may be determined to be associated with or correspond to an accessory based on a channel identifier encoded in the message (e.g., in portion 330), a command or data (e.g., included in the message) associated with the accessory, the communication of the message to the accessory, the communication of the message from the accessory, some combination thereof, etc. In this manner, embodiments may advantageously allow communication between an application of a portable electronic device and a plurality of accessories using a common or shared data exchange pattern for messages communicated over a connection (e.g., 115) between the portable electronic device (e.g., 110) and an accessory interface (e.g., 120).

The use of a common or shared data exchange pattern is advantageous since it standardizes or assimilates the message format for communications with a plurality of accessories (e.g., 130a, 130b, etc.) over the connection (e.g., 115) between a portable electronic device (e.g., 110) and an accessory interface (e.g., 120). By using the same message format (e.g., defined by the data exchange pattern) for messages associated with a plurality of accessories, overhead may be reduced and the efficiency of communication between portable electronic device 110 (or at least one application thereof) and accessory interface 120 over connection 115 may be increased. An increase in data communication efficiency over connection 115 may result in increased bandwidth of connection 115, thereby allowing an increase in the bandwidth of and/or speed of message communication over at least one connection (e.g., 125a, 125b, etc.) between at least one accessory (e.g., 130a, 130b, etc.) and accessory interface 120.

In one embodiment, the data exchange pattern may specify a relatively small message size to provide certain functionality while also reducing communication overhead, increasing communication efficiency, and/or increasing the bandwidth of one or more connections (e.g., 115, 125a, 125b, etc.). For example, where each message is 10 bytes in length, a four-byte data portion may advantageously be large enough to hold "int" or integer data types yet small enough to be handled by 32-bit processors (e.g., which are relatively inexpensive and readily available). A channel identifier, command type, and command metadata may be encoded in two bytes (e.g., where the channel identifier and command type may both be encoded in a single byte), thereby allowing message identification, message routing, command issuance (e.g., to cause one or more operations to be performed), and command response (e.g., to provide information about the result of the performance of the one or more operations). A data integrity value (e.g., a checksum, a hash, etc.) for the message (or a data portion thereof) may be encoded in one byte, thereby providing data integrity and/or error correction capabilities for the message. The remaining three bytes may hold a data length value associated with the length of the data portion (e.g., four bytes in this example), an initial value, and a final value.

The data exchange pattern used for communications between accessory interface 120 and portable electronic device 110 may be the same as a data exchange pattern used for communications between accessory interface 120 and at least one accessory (e.g., 130a, 130b, etc.) in one embodiment. In this case, accessory interface 120 may route and/or process messages without reformatting the messages or otherwise changing the data exchange pattern. Accordingly, embodiments may advantageously allow communication between an application of a portable electronic device and a plurality of accessories using a common or shared data exchange pattern for messages communicated over a connection (e.g., 115) between the portable electronic device (e.g., 110) and an accessory interface (e.g., 120) as well as at least one other connection (e.g., 125a, 125b, etc.) between the accessory interface (e.g., 120) and the plurality of accessories (e.g., 130a, 130b, etc.).

In one embodiment, the data exchange pattern used for communications between accessory interface 120 and portable electronic device 110 may be different from at least one other data exchange pattern used for communications between accessory interface 120 and at least one accessory (e.g., 130a, 130b, etc.). In this case, accessory interface 120 may reformat (and optionally perform other processing to) each message from a first data exchange pattern (e.g., used for communications between portable electronic device 110 and accessory interface 120) to a second data exchange pattern (e.g., used for communications between accessory interface 120 and the at least one accessory) before routing each message to the at least one accessory. Accessory interface 120 may reformat (and optionally perform other processing to) each message from a first data exchange pattern (e.g., used for communications between accessory interface 120 and at least one accessory) to a second data exchange pattern (e.g., used for communications between accessory interface 120 and portable electronic device 110) before communicating each message to portable electronic device 110. In this manner, accessory interface 120 may advantageously allow use of a common or shared data exchange pattern (e.g., for communication of messages between portable electronic device 110 and accessory interface 120) in conjunction with at least one other data exchange pattern (e.g., for communication of messages between accessory interface 120 and at least one accessory).

The same data exchange pattern may be used for communications between accessory interface 120 and a plurality of accessories (e.g., 130a, 130b, etc.) in one embodiment. In this case, the data exchange pattern used for communication of messages between accessory interface 120 and a plurality of accessories (e.g., 130a, 130b, etc.) may be the same as a data exchange pattern used for communication of messages between portable electronic device 110 and accessory interface 120 in one embodiment. Alternatively, the data exchange pattern used for communication of messages between accessory interface 120 and a plurality of accessories (e.g., 130a, 130b, etc.) may be different from a data exchange pattern used for communication of messages between portable electronic device 110 and accessory interface 120.

In one embodiment, at least two different data exchange patterns may be used for communications between accessory interface 120 and a plurality of accessories (e.g., 130a, 130b, etc.). For example, a first data exchange pattern may be used for communication of messages between accessory interface 120 and a first accessory (e.g., 130a), while a second data exchange pattern may be used for communication of messages between accessory interface 120 and a second accessory (e.g., 130b). The first data exchange pattern or the second data exchange pattern may be the same as a data exchange pattern used for communication of messages between portable electronic device 110 and accessory interface 120 in one embodiment. Alternatively, the first data exchange pattern and the second data exchange pattern may both be different from a data exchange pattern used for communication of messages between portable electronic device 110 and accessory interface 120.

The use of accessory interface 120 and/or a common or shared data exchange pattern (e.g., for communication of messages between components of system 100) may allow unidirectional and/or bidirectional communication of messages between an application executing on portable electronic device 110 and at least one accessory (e.g., 130a, 130b, etc.) in one embodiment. In one embodiment, full-duplex communication may be implemented to allow contemporaneous (or simultaneous) bidirectional communication of messages between an application executing on portable electronic device 110 and at least one accessory (e.g., 130a, 130b, etc.). For example, portable electronic device 110 may send a first message (e.g., intended for accessory 130a) over connection 115 at the same time that a second message (e.g., originating from accessory 130a or accessory 130b) is received (e.g., from accessory interface 120) over connection 115. As another example, accessory interface 120 may contemporaneously (or simultaneously) process and/or contemporaneously (or simultaneously) route incoming messages (e.g., either from an application of portable electronic device 110 or from at least one accessory) and outgoing messages (e.g., either from an application of portable electronic device 110 or from at least one accessory). And as yet another example, an accessory (e.g., 130a, 130b, etc.) may send a first message (e.g., intended for an application of portable electronic device 110) over a connection (e.g., 125a, 125b, etc.) at the same time that a second message (e.g., originating from the application) is received (e.g., from accessory interface 120) over the connection.

In one embodiment, portable electronic device 110 may be a mobile phone, tablet, laptop, portable music player, electronic organizer, PDA, pager, or the like. One or more components of system 100 (e.g., portable electronic device 110, accessory interface 120, accessory 130a, accessory 130b, etc.) may be implemented in accordance with computer system 700 of FIG. 7 in one embodiment.

Accordingly, one or more embodiments may allow communication of messages between an application (e.g., 114a, 114b, etc.) of a portable electronic device (e.g., 110) and at least one accessory (e.g., 130a, 130b, etc.), where such communication may be used in one or more practical applications. For example, portable electronic device 110 may be used as a remote control for home appliances or devices (e.g., a television, computer display, refrigerator, microwave, door lock, security system, etc.), for hobby-related devices (e.g., model cars, boats, planes, etc.), for professional equipment (e.g., robots, machinery, etc.), etc. As another example, portable electronic device 110 may be used as a common graphical user interface for various types of measurement equipment (e.g., multimeters, oscilloscopes, signal analyzers, spectrum analyzers, etc.). As yet another example, where each accessory of at least one accessory (e.g., 130a, 130b, etc.) is a medical sensor or medical device, portable electronic device 110 may be used for remote monitoring and/or diagnostics of patients using the at least one accessory. As another example, where each accessory of at least one accessory (e.g., 130a, 130b, etc.) is a sensor and/or module of an automobile, portable electronic device 110 may be used as the graphical user interface for an onboard diagnostics system for the automobile. And as a further example, portable electronic device 110 may be used to monitor and/or collect various types of information where each accessory of at least one accessory (e.g., 130a, 130b, etc.) is a sensor such as a soil sensor (e.g., measuring moisture, chemical composition, etc.), a fluid sensor, a motion sensor, or another type of sensor.

In one embodiment, a plurality of accessories of system 100 may each be the same type of accessory. For example, a plurality of accessories (e.g., 130a, 130b, etc.) may each be from the same manufacturer, of the same brand, of the same model, perform the same function, communicate (e.g., with accessory interface 120) in accordance with the same data exchange pattern, communicate (e.g., with accessory interface 120) over the same type of connection, communicate in accordance with the same communication protocol, some combination thereof, etc.

Alternatively, a plurality of accessories of system 100 may each be a different type of accessory. For example, a plurality of accessories (e.g., 130*a*, 130*b*, etc.) may each be from a different manufacturer, of a different brand, of a different model, perform a different function, communicate (e.g., with accessory interface 120) in accordance with a different data exchange pattern, communicate (e.g., with accessory interface 120) over a different type of connection, communicate in accordance with a different communication protocol, some combination thereof, etc.

Although FIG. 3 shows message 300 with a specific number and type of portions, it should be appreciated that message 300 may include a different number and/or type of portions in other embodiments. For example, message 300 may include fewer portions or at least one additional portion. As another example, a plurality of portions of message 300 may be combined into a smaller number of portions. Although FIG. 3 shows message 300 with a specific ordering of portions, it should be appreciated that message 300 may include a different ordering of portions in other embodiments.

Although FIG. 1 shows system 100 with a specific number and type of components, it should be appreciated that system 100 may include a different number and/or type of components in other embodiments. For example, any number of accessory interfaces (e.g., similar to accessory interface 120) may be communicatively coupled with portable electronic device 110, where each accessory interface may allow portable electronic device 110 (or at least one application thereof) to communicate messages with at least one additional accessory (e.g., separate from accessory 130*a*, 130*b*, etc.). As another example, at least one other portable electronic device (e.g., separate from portable electronic device 110) may be communicatively coupled with accessory interface 120, thereby allowing a plurality of portable electronic devices (or at least one respective application thereof) to communicate messages with at least one accessory (e.g., 130*a*, 130*b*, etc.) via accessory interface 120.

Figure 4:
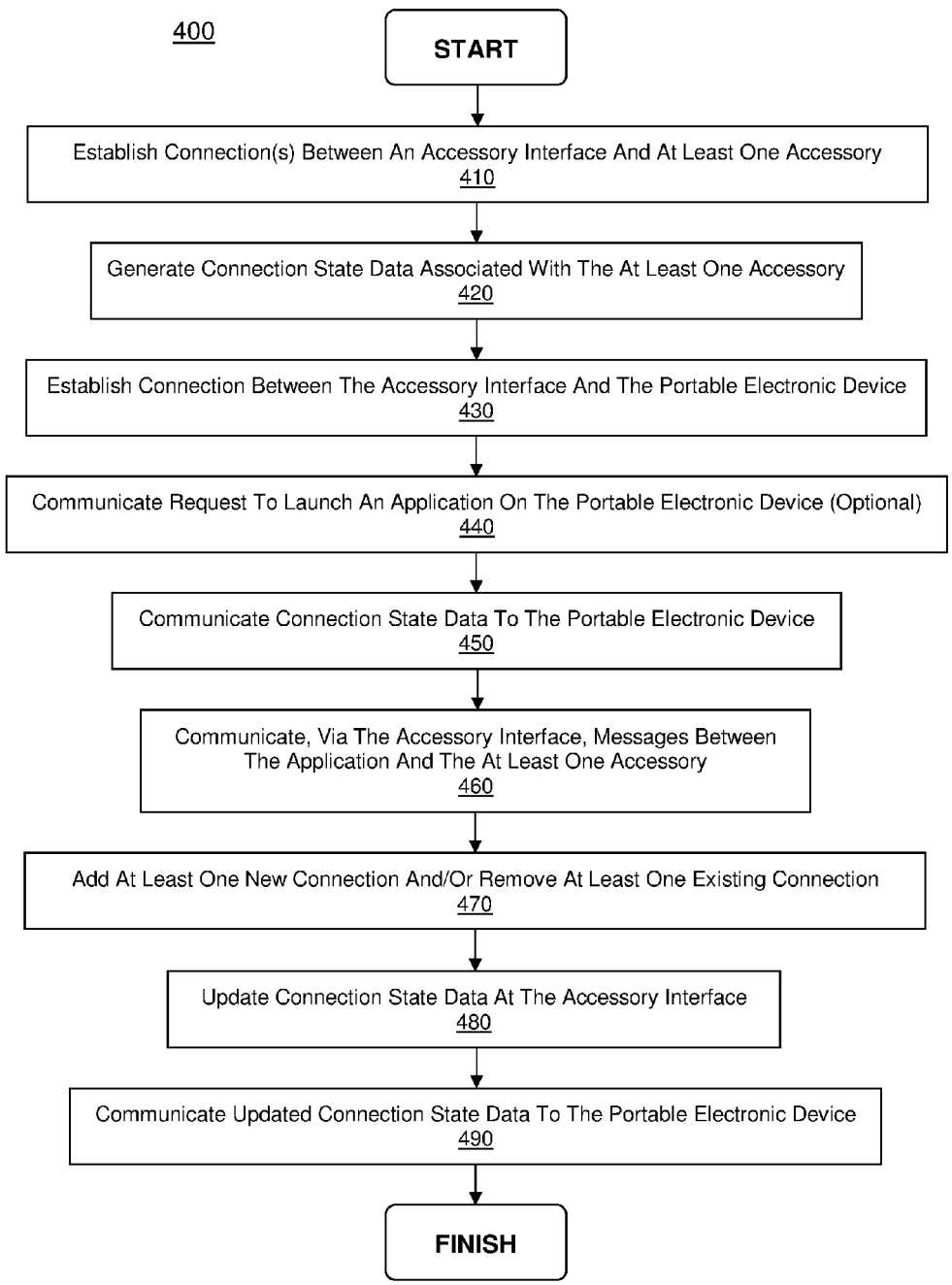
FIG. 4 shows a flowchart of a process for communicating information in accordance with one embodiment.

FIG. 4 shows a flowchart of process 400 for communicating information in accordance with one embodiment. As shown in FIG. 4, step 410 involves establishing at least one connection between an accessory interface and at least one accessory. Step 410 may be performed using a communication interface (e.g., 123) of the accessory interface (e.g., 120) in one embodiment. At least one connection (e.g., 125*a*, 125*b*, etc.) may be established between an accessory interface (e.g., 120) and at least one accessory (e.g., 130*a*, 130*b*, etc.) by electrically coupling the accessory interface and the at least one accessory (e.g., by connecting at least one plug to at least one receptacle, by otherwise communicatively coupling the accessory interface and the at least one accessory via a wired connection or interface, etc.), by sending a request to communicatively couple the accessory interface and the at least one accessory via a wireless connection or interface, by authenticating the accessory interface and/or the at least one accessory, by executing a handshake procedure, by agreeing on or exchanging at least one communication protocol for communication of messages between the accessory interface and the at least one accessory, by agreeing on or exchanging a data exchange pattern for communication of messages between the accessory interface and the at least one accessory, some combination thereof, etc.

In one embodiment, at least one connection (e.g., 125*a*, 125*b*, etc.) may be established between an accessory interface (e.g., 120) and at least one accessory (e.g., 130*a*, 130*b*, etc.) by agreeing on or exchanging an accessory protocol (or accessory communication protocol) and an application protocol (or an application communication protocol). For example, at least one accessory (e.g., 130*a*, 130*b*, etc.) may communicate information to at least one application (e.g., 114*a*, 114*b*, etc.) of portable electronic device 110 about at least one application protocol supported by the at least one accessory. The application protocol may be specific to the at least one accessory in one embodiment. As another example, at least one application (e.g., 114*a*, 114*b*, etc.) may communicate information to at least one accessory (e.g., 130*a*, 130*b*, etc.) of portable electronic device 110 about at least one accessory protocol supported by the at least one application. The accessory protocol may be specific to the at least one application in one embodiment.

It should be appreciated that a data exchange pattern may be independent of a communication protocol (e.g., an application protocol or application communication protocol, an accessory protocol or accessory communication protocol, etc.). For example, a communication protocol may specify parameters of communication other than at least one parameter defined or specified by the data exchange pattern, where the at least one parameter defined or specified by the data exchange pattern may include a designation of which portions each message should include, the ordering of the portions, the size or length of each portion, message size, some combination thereof, etc. Accordingly, messages formatted in accordance with the same data exchange pattern may be communicated in accordance with different communication protocols. Similarly, messages formatted in accordance with at least two different data exchange patterns may be communicated in accordance with the same communication protocol.

Step 420 involves generating connection state data associated with the at least one accessory. In one embodiment, the connection state data (e.g., 128, 200, etc.) may include a mapping of at least one channel to the at least one accessory (e.g., 130*a*, 130*b*, etc.), where each channel is assigned or corresponds to a respective accessory. In one embodiment, the connection state data (e.g., 128, 200, etc.) may be generated (e.g., by processor 126) in step 420 responsive to an identification (e.g., by processor 126) of the at least one accessory (e.g., in step 410). As such, the at least one accessory listed in the connection state data (e.g., 128, 200, etc.) may be in an active state and/or capable of communicating with the accessory interface (e.g., 120).

As shown in FIG. 4, step 430 involves establishing a connection between the accessory interface and a portable electronic device. Step 430 may be performed using a communication interface (e.g., 122) of the accessory interface (e.g., 120) in one embodiment. The accessory interface (e.g., 120) may be separate from the portable electronic device (e.g., 110). A connection (e.g., 115) may be established between the accessory interface (e.g., 120) and the portable electronic device (e.g., 110) by electrically coupling the accessory interface and the portable electronic device (e.g., by connecting at least one plug to at least one receptacle, by otherwise communicatively coupling the accessory interface and the portable electronic device via a wired connection or interface, etc.), by sending a request to communicatively couple the accessory interface and the portable electronic device via a wireless connection or interface, by authenticating the accessory interface and/or the portable electronic device, by executing a handshake procedure, by agreeing on a communication protocol and/or data exchange pattern for communication of messages between the accessory interface and the portable electronic device, some combination thereof, etc.

Step 440 involves optionally communicating a request to launch an application on the portable electronic device. The request may be communicated in step 440 by the accessory interface (e.g., 120) over the connection (e.g., 115) established in step 430. The request may be a request to launch an application (e.g., 114a, 114b, etc.) on the portable electronic device, where the application may be associated with the accessory interface (e.g., 120) and/or the at least one accessory (e.g., 130a, 130b, etc.) associated with the at least one connection established in step 410.

An application (e.g., 114a, 114b, etc.) associated with one or more accessories (e.g., 130a, 130b, etc.) may be an application executed by the portable electronic device (e.g., 110) that allows a user to interact with the one or more accessories. In one embodiment, the application associated with one or more accessories (e.g., 130a, 130b, etc.) may cause a graphical user interface to be displayed (e.g., on a display screen of the portable electronic device), where the graphical user interface may allow initiation and/or entry of at least one command (e.g., to be communicated via at least one message such as message 300, to cause at least one operation to be performed by the one or more accessories, some combination thereof, etc.), input of data (e.g., to be communicated via at least one message such as message 300, to be accessed and/or processed by the one or more accessories, some combination thereof, etc.), some combination thereof, etc. The graphical user interface may include content (e.g., at least one image, video, audio, etc.) associated with the one or more accessories and/or a manufacturer of the one or more accessories in one embodiment. In one embodiment, an application (e.g., 114a, 114b, etc.) associated with one or more accessories (e.g., 130a, 130b, etc.) may be an application with a name or filename corresponding to the one or more accessories. And in one embodiment, an application (e.g., 114a, 114b, etc.) associated with one or more accessories (e.g., 130a, 130b, etc.) may be specific to the one or more accessories, and therefore, may not be associated with at least one other accessory (e.g., may not be configured to communicate messages with the at least one other accessory).

An application (e.g., 114a, 114b, etc.) associated with the accessory interface (e.g., 120) may be an application executed by the portable electronic device (e.g., 110) that allows a user to interact with one or more accessories connected to the accessory interface (e.g., 120). In one embodiment, the application (e.g., 114a, 114b, etc.) associated with the accessory interface (e.g., 120) may allow configuration of the accessory interface. The application (e.g., 114a, 114b, etc.) associated with the accessory interface (e.g., 120) may cause a graphical user interface to be displayed (e.g., on a display screen of the portable electronic device). The graphical user interface may include content (e.g., at least one image, video, audio, etc.) associated with the accessory interface and/or a manufacturer of the accessory interface in one embodiment. In one embodiment, an application (e.g., 114a, 114b, etc.) associated with the accessory interface (e.g., 120) may be an application with a name or filename corresponding to the accessory interface. And in one embodiment, the application (e.g., 114a, 114b, etc.) associated with the accessory interface (e.g., 120) may be generic to a plurality of accessories (e.g., 130a, 130b, etc.), and therefore, may allow communication of messages with the plurality of accessories (e.g., 130a, 130b, etc.).

In one embodiment, a request to launch an application (e.g., 114a, 114b, etc.) may be communicated in step 440 to the portable electronic device (e.g., 110), which may then cause the application to be launched on the portable electronic device. Launching of the application on the portable electronic device may be performed by the operating system of the portable electronic device in one embodiment.

In one embodiment, step 440 may be bypassed or omitted. In this case, the application (e.g., 114a, 114b, etc.) may be automatically launched on the portable electronic device (e.g., 110) responsive to establishing a connection between the accessory interface and the portable electronic device in step 430. For example, the operating system of the portable electronic device may identify the application (e.g., 114a, 114b, etc.) as being associated with the accessory interface (e.g., 120) and/or the at least one accessory (e.g., 130a, 130b, etc.). Responsive to an identification of the application, the operating system may automatically launch the application on the portable electronic device (e.g., 110).

As shown in FIG. 4, step 450 involves communicating connection state data to the portable electronic device. Step 450 may involve communicating connection state data (e.g., 128, 200, etc.) generated in step 420 and/or stored in a memory (e.g., 127) of an accessory interface (e.g., 120). The connection state data may be communicated in step 450 over a connection (e.g., 115) between the accessory interface (e.g., 120) and the portable electronic device (e.g., 110). The connection state data may be communicated via a communication interface (e.g., 122) of the accessory interface (e.g., 120) and a communication interface (e.g., 112) of the portable electronic device (e.g., 110). In one embodiment, communication of the connection state data in step 450 may be performed by a processor (e.g., 126) of the accessory interface (e.g., 120) providing the connection state data to a communication interface (e.g., 122) of the accessory interface (e.g., 120) for communication to the portable electronic device (e.g., 110).

In one embodiment, the connection state data (e.g., 128, 200, etc.) may be communicated to the portable electronic device for updating existing connection state data (e.g., 118) stored on the portable electronic device (e.g., to synchronize connection state data 118 with connection state data 128). In this case, the entire connection state data (e.g., 128, 200, etc.) may be communicated or only a portion thereof may be communicated (e.g., the portion of connection state data 128 that is different from existing connection state data 118 stored at the portable electronic device). Alternatively, the connection state data (e.g., 128, 200, etc.) may be communicated to the portable electronic device where no previous connection state data is stored on the portable electronic device.

In one embodiment, connection state data (e.g., 128, 200, etc.) may be communicated to the portable electronic device in step 450 as a response to a command (e.g., responsive to receiving a message associated with a command from the portable electronic device and/or an application thereof). For example, a first message associated with a command to get an accessory identifier of an accessory connected to a first channel may be sent from the portable electronic device (or an application thereof) to the accessory interface (e.g., 120). In one embodiment, the first message may include a "GET" command type (e.g., in portion 320), a first channel identifier (e.g., in portion 330), and command metadata (e.g., in portion 340) such as "ACCESSORY NAME" or "ACCESSORY TYPE NAME" to indicate that an accessory identifier or name is desired for the accessory assigned or connected to the first channel. Responsive to determining whether an accessory is assigned or connected to the first channel (e.g., by accessing connection state data 128), the accessory interface (e.g., 120) may communicate to the portable electronic device (or an application thereof) a second message (associated with a response to the first message) that includes information about an accessory assigned or connected to the first channel (e.g., if an accessory is assigned or connected to the first channel). In one embodiment, the second message may include a "RETVAL" command type (e.g., in portion 320), a first channel identifier (e.g., in portion 330), and command metadata (e.g., in portion 340) such as "GREEN LED" to indicate that an accessory with a name or identifier of "GREEN LED" is assigned or connected to the first channel.

In this example, a third message associated with a command to get an accessory identifier of an accessory connected to a second channel may be sent from the portable electronic device (or an application thereof) to the accessory interface (e.g., 120). In one embodiment, the third message may include a "GET" command type (e.g., in portion 320), a second channel identifier (e.g., in portion 330), and command metadata (e.g., in portion 340) such as "ACCESSORY NAME" or "ACCESSORY TYPE NAME" to indicate that an accessory identifier or name is desired for the accessory assigned or connected to the second channel. Responsive to determining whether an accessory is assigned or connected to the second channel (e.g., by accessing connection state data 128), the accessory interface (e.g., 120) may communicate to the portable electronic device (or an application thereof) a fourth message (associated with a response to the third message) that includes information about an accessory assigned or connected to the second channel (e.g., if an accessory is assigned or connected to the second channel). In one embodiment, the fourth message may include a "RETVAL" command type (e.g., in portion 320), a second channel identifier (e.g., in portion 330), and command metadata (e.g., in portion 340) such as "MOTOR" to indicate that an accessory with a name or identifier of "MOTOR" is assigned or connected to the first channel.

In one embodiment, messages associated with commands and responses may be sent between the portable electronic device (or at least one application thereof) and the accessory interface (e.g., in accordance with the previous example) for all channels or some portion thereof. In one embodiment, messages associated with commands and responses may be sent between the portable electronic device (or at least one application thereof) and the accessory interface (e.g., in accordance with the previous example) until connection state data for at least one accessory has been identified by the portable electronic device (or at least one application thereof). For example, where an application of the portable electronic device is associated with two accessories (e.g., a green LED and a motor), messages associated with commands and responses may be sent between the portable electronic device (or at least one application thereof) and the accessory interface (e.g., in accordance with the previous example) until connection state data for the two accessories has been received by the portable electronic device and/or the application.

Responsive to receiving a message associated with a command to get an accessory identifier of an accessory connected to a particular channel, the accessory interface (e.g., 120) may communicate a response indicating that no accessory is connected to the particular channel in one embodiment. For example, a message sent from accessory interface (e.g., 120) in response to a message associated with a command to get an accessory identifier of an accessory connected to a particular channel) may include a "RETVAL" command type (e.g., in portion 320), a channel identifier associated with the particular channel (e.g., in portion 330), and command metadata (e.g., in portion 340) such as "DISCONNECTED" to indicate that no accessory is assigned or connected to the particular channel. In one embodiment, the portable electronic device (or at least one application thereof) may discontinue querying the remaining channels (e.g., where it is known that the accessory interface will assign and/or reassign all connected accessories to consecutive channels). Alternatively, the portable electronic device (or at least one application thereof) may continue querying at least one channel of the remaining channels (e.g., where it is not known or uncertain whether the accessory interface will assign and/or reassign all connected accessories to consecutive channels, where a predetermined number of channels have been queried, etc.).

As shown in FIG. 4, step 460 involves communicating, via the accessory interface, messages between the application and the at least one accessory. In one embodiment, step 460 may involve communicating, via the accessory interface (e.g., 120), a first set of messages between an application of the portable electronic device (e.g., 110) and a first accessory (e.g., 130*a*) of a plurality of accessories. It may be determined that the first set of messages corresponds to the first accessory based on first information encoded in the first set of messages. Each message of the first set of messages communicated between the portable electronic device and the accessory interface may be formatted in accordance with a data exchange pattern.

In this case, step 460 may also involve communicating, via the accessory interface (e.g., 120), a second set of messages between the application of the portable electronic device (e.g., 110) and a second accessory (e.g., 130*b*) of the plurality of accessories. It may be determined that the second set of messages corresponds to the second accessory based on second information encoded in the second set of messages. Each message of the second set of messages communicated between the portable electronic device and the accessory interface may be formatted in accordance with the data exchange pattern (e.g., the same data exchange pattern that each message of the first set of messages communicated between the portable electronic device and the accessory interface is formatted in accordance with).

Step 460 may be performed by one or more components of system 100 (e.g., portable electronic device 110, accessory interface 120, accessory 130*a*, accessory 130*b*, etc.) in one embodiment. And in one embodiment, step 460 may be performed in accordance with process 500 of FIG. 5.

Figure 5:
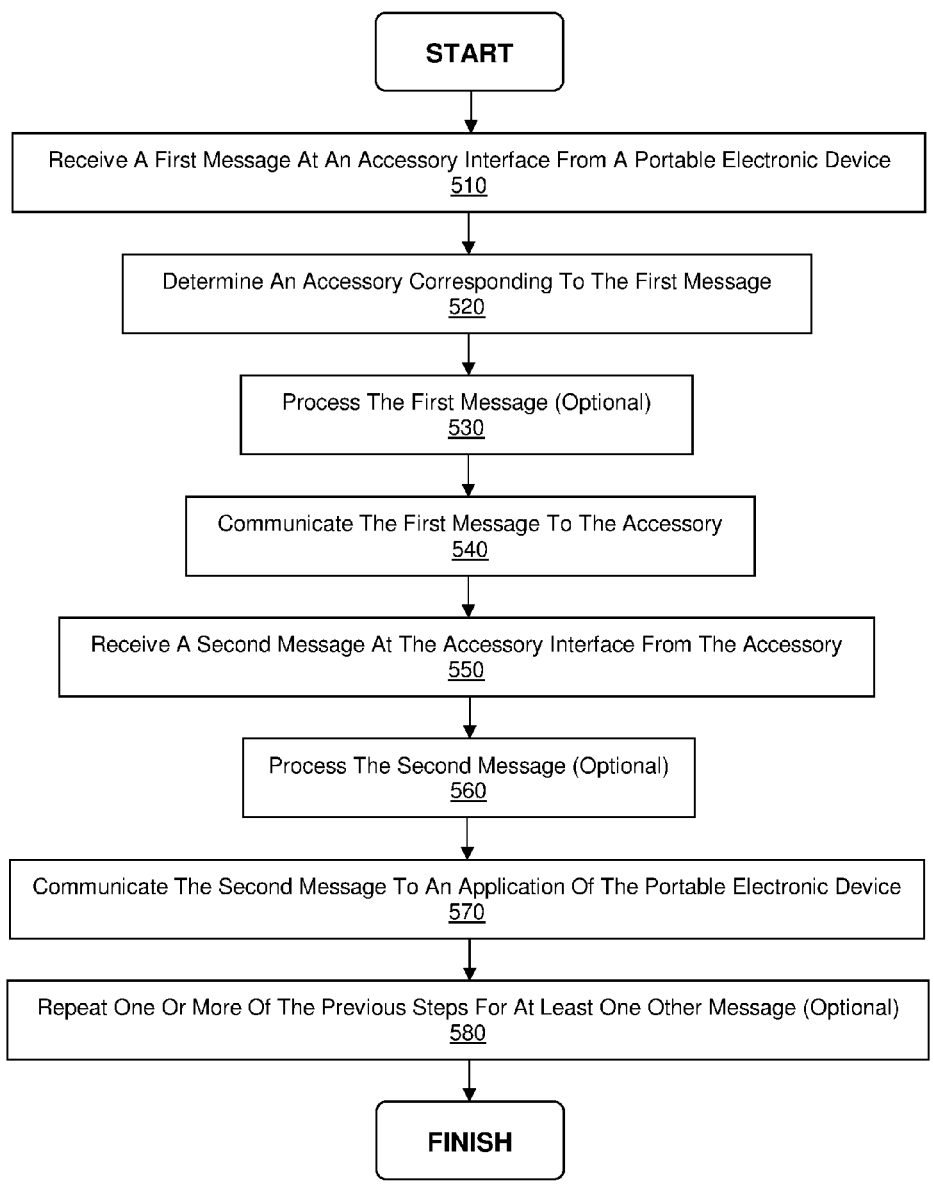
FIG. 5 shows a flowchart of a process for communicating messages between an application and at least one accessory in accordance with one embodiment.
Figure 6:
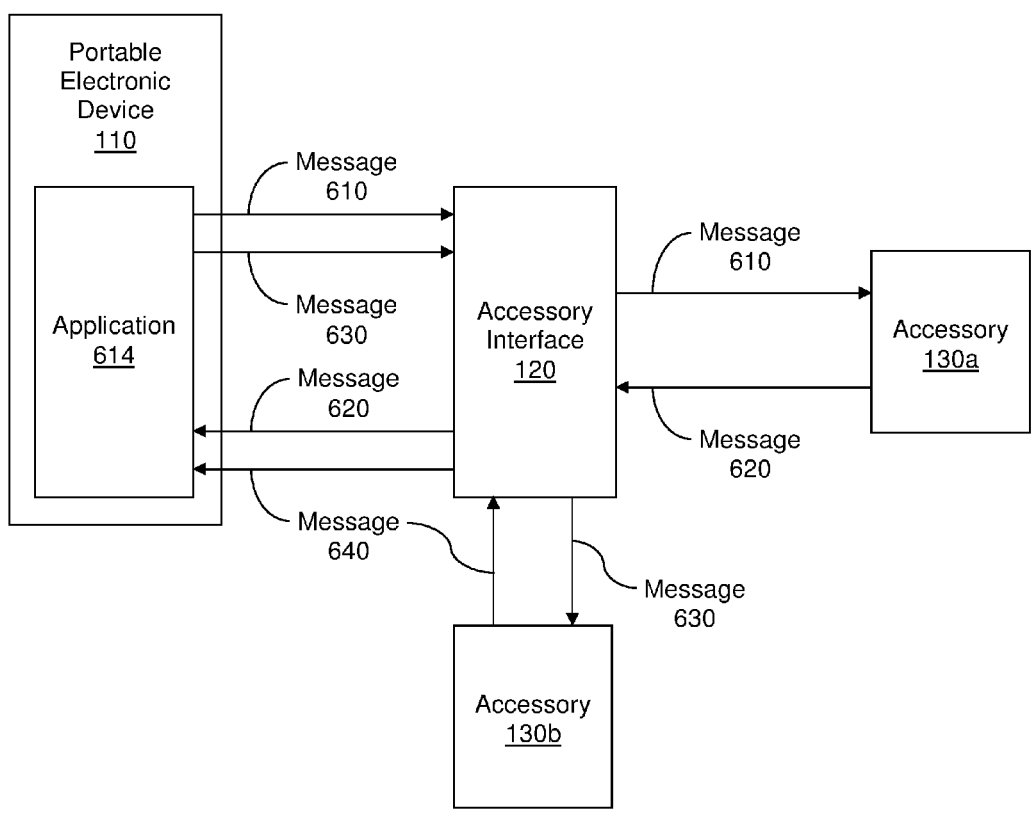
FIG. 6 shows a block diagram depicting communication of messages between an application and at least one accessory in accordance with one embodiment.

FIG. 5 shows a flowchart of process 500 for communicating messages between an application and at least one accessory in accordance with one embodiment. FIG. 6 shows block diagram 600 depicting communication of messages between an application and at least one accessory in accordance with one embodiment. FIGS. 5 and 6 will be described together.

As shown in FIG. 5, step 510 involves receiving a first message at an accessory interface from a portable electronic device. The first message (e.g., 610) may be implemented in accordance with message 300 in one embodiment. The first message may be received in step 510 over a connection (e.g., 115) via a communication interface (e.g., 122) of accessory interface (e.g., 120). In one embodiment, receipt of the first message (e.g., 610) in step 510 may be performed by a communication interface (e.g., 122) of the accessory interface (e.g., 120) providing the first message to a processor (e.g., 126) of the accessory interface (e.g., 120). In this case, the processor (e.g., 126) may access the first message (e.g., 610) from the communication interface (e.g., 122). And in one embodiment, the first message (e.g., 610) may be formatted in accordance with a first data exchange pattern (e.g., used for communications between the portable electronic device 110 and accessory interface 120).

The first message (e.g., 610) may be received at the accessory interface (e.g., 120) in step 510 from an application (e.g., 614) executed by a portable electronic device (e.g., 110) in one embodiment. Application 614, as shown in FIG. 6, may be implemented by an application of portable electronic device 110 (e.g., application 114*a*, application 114*b*, etc.) in one embodiment.

In one embodiment, the first message may be generated by an application (e.g., 614) or based on information from the application. For example, a graphical user interface displayed by the application may allow initiation and/or entry of at least one command (e.g., to be communicated via the first message, to cause at least one operation to be performed by one or more accessories corresponding to the first message, some combination thereof, etc.), input of data (e.g., to be communicated via the first message, to be accessed and/or processed by one or more accessories corresponding to the first message, some combination thereof, etc.), some combination thereof, etc.

Step 520 involves determining an accessory corresponding to the first message. For example, a processor (e.g., 126) of the accessory interface (e.g., 120) may access the first message and determine that the first message corresponds to a first accessory (e.g., 130*a*) based on information encoded in the first message (e.g., 610). The information encoded in the first message may include a first channel identifier (e.g., similar to that included in portion 330 of message 300), where the processor (e.g., 126) may use a mapping of the first channel identifier to the first accessory (e.g., 130*a*) to determine that the first message corresponds to a first accessory (e.g., 130*a*). The mapping may be part of connection state data (e.g., 128) stored in a memory (e.g., 127) of the accessory interface (e.g., 120) in one embodiment.

As shown in FIG. 5, step 530 involves optionally processing the first message (e.g., using processor 126 of accessory interface 120). In one embodiment, where a second data exchange pattern is used for communications between the accessory interface (e.g., 120) and the first accessory (e.g., 130*a*), processing of the first message in step 530 may involve reformatting the first message from the first data exchange pattern to the second data exchange pattern. Other processing of the first message (e.g., decrypting, encrypting, compressing, etc.) may be performed (e.g., in addition to reformatting) in one embodiment. Alternatively, where the first data exchange pattern is used for communications between the accessory interface (e.g., 120) and the first accessory (e.g., 130*a*), the first message may not be reformatted and either step 530 may be omitted (e.g., where no other processing of the first message is performed) or other processing of the first message (e.g., decrypting, encrypting, compressing, other processing separate from reformatting, etc.) may be performed in step 530.

Step 540 involves communicating (or routing) the first message to the accessory (e.g., determined in step 520). The first message (e.g., 610) may be communicated in step 540 over a connection (e.g., 125*a*) between the accessory interface (e.g., 120) and the first accessory (e.g., 130*a*). The first message may be communicated via a communication interface (e.g., 123) of the accessory interface (e.g., 120) and a communication interface (e.g., 133*a*) of the first accessory (e.g., 130*a*). In one embodiment, communication of the first message in step 540 may be performed by a processor (e.g., 126) of the accessory interface (e.g., 120) providing the first message to a communication interface (e.g., 123) of the accessory interface (e.g., 120) for communication to the first accessory (e.g., 130*a*).

Where the first message (e.g., 610) was reformatted in step 530, step 540 may involve communicating the first message in accordance with a second data exchange pattern (e.g., that is different from the first data exchange pattern used to communicate the first message from the portable electronic device to the accessory interface). Alternatively, where the first message (e.g., 610) was not reformatted in step 530, step 540 may involve communicating the first message in accordance with the first data exchange pattern used to communicate the first message from the portable electronic device to the accessory interface.

As shown in FIG. 5, step 550 may involve receiving a second message (e.g., 620) at the accessory interface (e.g., 120) from the first accessory (e.g., 130*a*). The second message (e.g., 620) may be implemented in accordance with message 300 in one embodiment. The second message may be received in step 550 over a connection (e.g., 125*a*) via a communication interface (e.g., 123) of accessory interface (e.g., 120). In one embodiment, receipt of the second message in step 550 may be performed by a communication interface (e.g., 123) of the accessory interface (e.g., 120) providing the second message to a processor (e.g., 126) of the accessory interface (e.g., 120). In this case, the processor (e.g., 126) may access the second message (e.g., 620) from the communication interface (e.g., 123). The second message (e.g., 620) may be formatted in accordance with the same data exchange pattern used to communicate the first message (e.g., 610) in step 540 (e.g., from the accessory interface to the accessory).

As shown in FIG. 5, step 560 involves optionally processing the second message. In one embodiment, where a second data exchange pattern is used for communications between the accessory interface (e.g., 120) and the accessory (e.g., 130*a*), processing of the second message in step 560 may involve reformatting the second message from the second data exchange pattern to the first data exchange pattern (e.g., used for communications between the portable electronic device and the accessory interface). Other processing of the second message (e.g., decrypting, encrypting, compressing, etc.) may be performed (e.g., in addition to reformatting) in one embodiment. Alternatively, where the first data exchange pattern is used for communications between the accessory interface (e.g., 120) and the accessory (e.g., 130*a*), the second message may not be reformatted and either step 560 may be omitted (e.g., where no other processing of the second message is performed) or other processing of the second message (e.g., decrypting, encrypting, compressing, other processing separate from reformatting, etc.) may be performed in step 560.

Step 570 involves communicating the second message to the application. The second message (e.g., 620) may be communicated in step 570 over a connection (e.g., 115) between the accessory interface (e.g., 120) and the portable electronic device (e.g., 110). The second message may be communicated via a communication interface (e.g., 122) of the accessory interface (e.g., 120) and a communication interface (e.g., 112) of the portable electronic device (e.g., 110). In one embodiment, communication of the second message in step 570 may be performed by a processor (e.g., 126) of the accessory interface (e.g., 120) providing the second message to a communication interface (e.g., 122) of the accessory interface (e.g., 120) for communication to the application. The second message (e.g., 620) communicated in step 570 may be formatted in accordance with the first data exchange pattern (e.g., the same data exchange pattern used to communicate the first message from the portable electronic device to the accessory interface).

In one embodiment, connection state data (e.g., 118) stored at the portable electronic device (e.g., 110) may be used to route the second message (e.g., 620) to an appropriate and/or corresponding application (e.g., 614). For example, it may be determined that the second message corresponds to the first accessory (e.g., 130a) based on information encoded in the second message (e.g., 620), where the information may include a first channel identifier (e.g., similar to that included in portion 330 of message 300). A mapping (e.g., included as part of connection state data 118) of the first channel identifier to the first accessory (e.g., 130a) may be used to determine that the second message corresponds to the first accessory (e.g., 130a). The second message (e.g., 620) may then be routed to an application (e.g., 614) that is associated with the first accessory (e.g., 130a), to an application (e.g., 614) that is associated with the accessory interface (e.g., 120), etc.

The application (e.g., 614) of the portable electronic device (e.g., 110) may thereafter perform one or more operations based on the second message (e.g., 610). For example, responsive to determining that the second message is associated with the first message (e.g., based on the first channel identifier included in the second message, based on another communication from the operating system or another component of the portable electronic device that otherwise indicates that the second message is associated with the first message, etc.), the application may perform processing based on the second message (e.g., processing using information of the second message, etc.). As another example, the application (e.g., 614) may change or update the display of a graphical user interface based on information included in the second message.

As shown in FIG. 5, step 580 involves optionally repeating one or more of the previous steps of process 500 for at least one other message. In one embodiment, the at least one other message may include one or more messages that correspond to the same accessory as the first and second messages (e.g., accessory 130a), and therefore, similar operations may be performed in step 580 with respect to these messages as were performed with respect to the first and second messages in one or more of the previous steps of process 500.

Alternatively, the at least one other message may include one or more messages that correspond to at least one other accessory (e.g., 130b) in one embodiment. In this case, a third message (e.g., 630) formatted in accordance with the first data exchange pattern (e.g., the same data exchange pattern used for communication of first message 610 and second message 620 between the portable electronic device and the accessory interface) may be received in step 510 similarly to receipt of the first message (e.g., 610) as discussed previously with respect to step 510.

An accessory corresponding to the third message may be determined in step 520. For example, a processor (e.g., 126) of the accessory interface (e.g., 120) may determine that the third message (e.g., 630) corresponds to a second accessory (e.g., 130b) based on information encoded in the third message (e.g., 630). The information may include a second channel identifier (e.g., similar to that included in portion 330 of message 300), where the processor (e.g., 126) may use a mapping of the second channel identifier to the second accessory (e.g., 130b) to determine that the third message corresponds to a second accessory (e.g., 130b). The mapping may be part of connection state data (e.g., 128) stored in a memory (e.g., 127) of the accessory interface (e.g., 120) in one embodiment.

The third message may be optionally processed in step 530 (e.g., using processor 126 of accessory interface 120). In one embodiment, where a third data exchange pattern is used for communications between the accessory interface (e.g., 120) and the second accessory (e.g., 130b), processing of the third message in step 530 may involve reformatting the third message from the first data exchange pattern to the third data exchange pattern. Other processing of the third message (e.g., decrypting, encrypting, compressing, etc.) may be performed (e.g., in addition to reformatting) in one embodiment. Alternatively, where the first data exchange pattern is used for communications between the accessory interface (e.g., 120) and the second accessory (e.g., 130b), the third message may not be reformatted and either step 530 may be omitted (e.g., where no other processing of the third message is performed) or other processing of the third message (e.g., decrypting, encrypting, compressing, other processing separate from reformatting, etc.) may be performed in step 530.

The third message may then be communicated or routed to the second accessory (e.g., 130b) in step 540 over a connection (e.g., 125b) between the accessory interface (e.g., 120) and the second accessory (e.g., 130b). Where the third message (e.g., 630) was reformatted in step 530, the third message may be communicated in step 540 in accordance with a third data exchange pattern. The third data exchange pattern may be different from the first data exchange pattern (e.g., used to communicate messages between the portable electronic device and the accessory interface). In one embodiment, third data exchange pattern may be different from the second data exchange pattern (e.g., used to communicate messages between the accessory interface and the first accessory where the accessory interface reformats messages between the first and second data exchange patterns). Alternatively, where the third message (e.g., 630) was not reformatted in step 530, the third message may be communicated in step 540 in accordance with the first data exchange pattern used to communicate the third message from the portable electronic device to the accessory interface.

A fourth message (e.g., 640) may be received in step 550 similarly to receipt of the second message (e.g., 620) as discussed previously with respect to step 550. The fourth message may be optionally processed in step 560. In one embodiment, where a third data exchange pattern is used for communications between the accessory interface (e.g., 120) and the second accessory (e.g., 130b), processing of the fourth message in step 560 may involve reformatting the fourth message from the third data exchange pattern to the first data exchange pattern (e.g., used for communications between the portable electronic device and the accessory interface). Other processing of the fourth message (e.g., decrypting, encrypting, compressing, etc.) may be performed (e.g., in addition to reformatting) in one embodiment. Alternatively, where the first data exchange pattern is used for communications between the accessory interface (e.g., 120) and the second accessory (e.g., 130b), the fourth message may not be reformatted and either step 560 may be omitted (e.g., where no other processing of the fourth message is performed) or other processing of the fourth message (e.g., decrypting, encrypting, compressing, other processing separate from reformatting, etc.) may be performed in step 560.

The fourth message (e.g., 640) may be communicated to an application (e.g., 614) in step 570 similarly to communication of the second message (e.g., 620) as discussed previously with respect to step 570. In one embodiment, connection state data (e.g., 118) stored at the portable electronic device (e.g., 110) may be used to route the fourth message (e.g., 640) to an appropriate and/or corresponding application (e.g., 614). For example, it may be determined that the fourth message corresponds to the second accessory (e.g., 130b) based on information encoded in the fourth message (e.g., 640), where the information may include a second channel identifier (e.g., similar to that included in portion 330 of message 300). A mapping (e.g., included as part of connection state data 118) of the second channel identifier to the second accessory (e.g., 130b) may be used to determine that the fourth message corresponds to the second accessory (e.g., 130b). The fourth message (e.g., 640) may then be routed to an application (e.g., 614) that is associated with the second accessory (e.g., 130b), to an application (e.g., 614) that is associated with the accessory interface (e.g., 120), etc.

In one embodiment, the application associated with the fourth message (e.g., 640) may be the same as the application associated with the second message (e.g., 620). Alternatively, the application associated with the fourth message (e.g., 640) may be different from the application associated with the second message (e.g., 620).

The application (e.g., 614) of the portable electronic device (e.g., 110) may thereafter perform one or more operations based on the fourth message (e.g., 640). For example, responsive to determining that the fourth message is associated with the third message (e.g., based on the second channel identifier included in the fourth message, based on another communication from the operating system or another component of the portable electronic device that otherwise indicates that the fourth message is associated with the third message, etc.), the application may perform processing based on the fourth message (e.g., processing using information of the fourth message, etc.). As another example, the application (e.g., 614) may change or update the display of a graphical user interface based on information included in the fourth message.

In one embodiment, one or more message communications (e.g., depicted by arrows in FIG. 6) may occur sequentially. Alternatively, one or more message communications (e.g., depicted by arrows in FIG. 6) may occur contemporaneously or simultaneously.

One or more embodiments may allow unidirectional and/or bidirectional communication of messages (e.g., 610, 620, 630, 640, etc.) between an application (e.g., 614) of a portable electronic device (e.g., 110) and at least one accessory (e.g., 130a, 130b, etc.). In one embodiment, full-duplex communication may be implemented to allow contemporaneous (or simultaneous) bidirectional communication of messages (e.g., 610, 620, 630, 640, etc.) between an application (e.g., 614) of a portable electronic device (e.g., 110) and at least one accessory (e.g., 130a, 130b, etc.).

In one embodiment, where accessory 130a comprises a green LED, the green LED may be turned on by generating (e.g., using application 614 of portable electronic device 110) and communicating (e.g., to accessory interface 120) the first message (e.g., 610) including a command type of "DOWORK," a channel identifier of "0000" (e.g., indicating a first channel associated with the first accessory), and command metadata of "SWITCH_ON." The accessory interface (e.g., 120) may extract the channel identifier, use the channel identifier to determine that the first message (e.g., 610) is associated with the first accessory (e.g., 130a), and communicate the first message (e.g., without first reformatting to a new data exchange pattern, after reformatting to a new data exchange pattern, etc.) to the first accessory (e.g., 130a). At least one component of the green LED (or of a device or system that includes the green LED) may then extract the command metadata of "SWITCH_ON" and proceed to perform at least one operation (e.g., applying a voltage or current to a circuit including the green LED) to turn on the green LED.

Responsive to the green LED being switched on, a response to the command may be provided by generating (at first accessory 130a and/or at accessory interface 120) and communicating (e.g., to application 614 of portable electronic device 110) the second message (e.g., 620) including a command type of "RETVAL," a channel identifier of "0000" (e.g., indicating a first channel associated with the green LED), and command metadata of "SWITCH_ON." As such, the application (e.g., 614) may access the second message (e.g., 620) and determine that the green LED was successfully turned on. In one embodiment, the status of the at least one operation (e.g., successfully turning on the green LED) may be shown on and/or included in a graphical user interface displayed using the application, where the graphical user interface may also allow a user to control the state (e.g., turned on, turned off, etc.) of first accessory 130a (e.g., including the green LED).

In one embodiment, where accessory 130b comprises a motor, the motor may be rotated by generating (e.g., using application 614 of portable electronic device 110) and communicating (e.g., to accessory interface 120) the third message (e.g., 630) including a command type of "DOWORK," a channel identifier of "0001" (e.g., indicating a second channel associated with the second accessory), command metadata of "TURN_CLOCKWISE," and data of "30" (e.g., indicating that the command is associated with turning the motor 30 degrees). The accessory interface (e.g., 120) may extract the channel identifier, use the channel identifier to determine that the third message (e.g., 630) is associated with the second accessory (e.g., 130b), and communicate the third message (e.g., without first reformatting to a new data exchange pattern, after reformatting to a new data exchange pattern, etc.) to the second accessory (e.g., 130b). At least one component of the motor (or of a device or system that includes the motor) may then extract information from the message (e.g., the command metadata of "TURN_CLOCKWISE" and the data of "30") and proceed to perform at least one operation (e.g., applying a voltage or current to the motor or a circuit thereof) to turn the motor 30 degrees clockwise.

Responsive to the motor being turned, a response to the command may be provided by generating (at second accessory 130b and/or at accessory interface 120) and communicating (e.g., to application 614 of portable electronic device 110) the fourth message (e.g., 640) including a command type of "RETVAL," a channel identifier of "0001" (e.g., indicating a second channel associated with the second accessory), command metadata of "TURN_CLOCKWISE," and data of "30" (e.g., indicating that the motor was actually turned 30 degrees). As such, the application (e.g., 614) may access the fourth message (e.g., 640) and determine that the motor was successfully turned 30 degrees clockwise. In one embodiment, the status of the at least one operation (e.g., successfully turning the motor 30 degrees clockwise) may be shown on and/or included in a graphical user interface displayed using the application, where the graphical user interface may also allow a user to control the state (e.g., direction of rotation of the motor, amount of rotation of the motor, rotational speed of the motor, a stopping point or position of the motor, etc.) of second accessory 130*b* (e.g., including the motor).

In one embodiment, the first message (e.g., 610) and/or third message (e.g., 630) may be associated with a command or first data to be exchanged (e.g., between application 614 and at least one accessory), where the second message (e.g., 620) and/or fourth message (e.g., 640) may be associated with a response to a command or second data to be exchanged (e.g., between application 614 and at least one accessory). In this manner, an application (e.g., 614) of a portable electronic device (e.g., 110) may send commands to control at least one accessory (e.g. 130*a*, 130*b*, etc.) and/or initiate an exchange of data with at least one accessory (e.g. 130*a*, 130*b*, etc.).

Alternatively, the second message (e.g., 620) and/or fourth message (e.g., 640) may be associated with a command or first data to be exchanged (e.g., between application 614 and at least one accessory), where the first message (e.g., 610) and/or third message (e.g., 630) may be associated with a response to a command or second data to be exchanged (e.g., between application 614 and at least one accessory). In this manner, at least one accessory (e.g. 130*a*, 130*b*, etc.) may send commands to control an application (e.g., 614) of a portable electronic device (e.g., 110) and/or initiate an exchange of data with an application (e.g., 614) of a portable electronic device (e.g., 110).

Although FIG. 5 depicts process 500 as including a specific number of steps, it should be appreciated that process 500 may include a different number of steps in other embodiments. For example, one or more steps of process 500 (e.g., step 530, step 560, etc.) may be omitted or bypassed in one or more embodiments. Although FIG. 5 depicts process 500 as including a specific ordering of steps, it should be appreciated that process 500 may include a different ordering of steps in other embodiments. For example, where the second message (e.g., 620) is associated with a command or first data to be exchanged (e.g., between application 614 and at least one accessory), and further where the first message (e.g., 610) is associated with a response to a command or second data to be exchanged (e.g., between application 614 and at least one accessory), steps 550 through 570 may be performed before steps 510 through 540.

Although FIG. 6 shows block diagram 600 with a specific number and type of components, it should be appreciated that a different number and/or type of components may be included or involved in other embodiments. For example, any number of accessories (e.g., similar to accessory 130*a*, accessory 130*b*, etc.) may communicate with accessory interface 120 in other embodiments. As another example, any number of accessory interfaces (e.g., similar to accessory interface 120) may communicate with portable electronic device 110, where each accessory interface may allow portable electronic device 110 (or at least one application thereof) to communicate messages with at least one additional accessory (e.g., separate from accessory 130*a*, 130*b*, etc.). As yet another example, at least one other portable electronic device (e.g., separate from portable electronic device 110) may communicate with accessory interface 120, thereby allowing a plurality of portable electronic devices (or at least one respective application thereof) to communicate messages with at least one accessory (e.g., 130*a*, 130*b*, etc.) via accessory interface 120.

Turning back to FIG. 4, step 470 involves adding at least one new connection and/or removing at least one existing connection. In one embodiment, step 470 may involve adding at least one new connection between accessory interface 120 and at least one additional accessory (e.g., in addition to the at least one accessory with which at least one connection was established in step 410). In this case, at least one new connection with the at least one additional accessory (e.g., including or similar to accessory 130*a*, accessory 130*b*, etc.) may be established in step 470 similarly to establishment of the at least one connection with the at least one accessory in step 410.

In one embodiment, step 470 may involve removing at least one existing connection between accessory interface 120 and the at least one accessory with which at least one connection was established in step 410. The removal of at least one existing connection in step 470 may be performed by or responsive to breaking (or interrupting) an electrical coupling of the accessory interface and the at least one accessory (e.g., by disconnecting at least one plug from at least one receptacle, by otherwise breaking or interrupting the communicative coupling of the accessory interface and the at least one accessory via a wired connection or interface, etc.), by sending a request to break (or interrupt) a communicative coupling of the accessory interface and the at least one accessory via a wireless connection or interface, by deauthenticating the accessory interface and/or the at least one accessory, some combination thereof, etc.

As shown in FIG. 4, step 480 involves updating the connection state data (e.g., 128) at the accessory interface (e.g., stored in memory 127). In one embodiment, step 480 may involve updating the existing connection state data to reflect the addition of at least one new connection and/or the removal of at least one existing connection in step 470. In one embodiment, step 480 may involve updating the existing connection state data by generating new connection state data similarly to the generation of the connection state data in step 420.

Step 490 involves communicating the updated connection state data to the portable electronic device. In one embodiment, the updated connection state data (e.g., changed or generated in step 480) may be communicated to the portable electronic device (e.g., 110) similarly to the communication of the connection state data in step 450. As such, in one embodiment, connection state data (e.g., 118) stored at the portable electronic device (e.g., 110) may thereafter be updated to reflect the addition of at least one new connection and/or the removal of at least one existing connection (e.g., performed in step 470). In one embodiment, communication of the updated connection state data in step 490 may allow synchronization of connection state data 118 with connection state data 128.

Although FIG. 4 depicts process 400 as including a specific number of steps, it should be appreciated that process 400 may include a different number of steps in other embodiments. Although FIG. 4 depicts process 400 as including a specific ordering of steps, it should be appreciated that process 400 may include a different ordering of steps in other embodiments.

Figure 7:
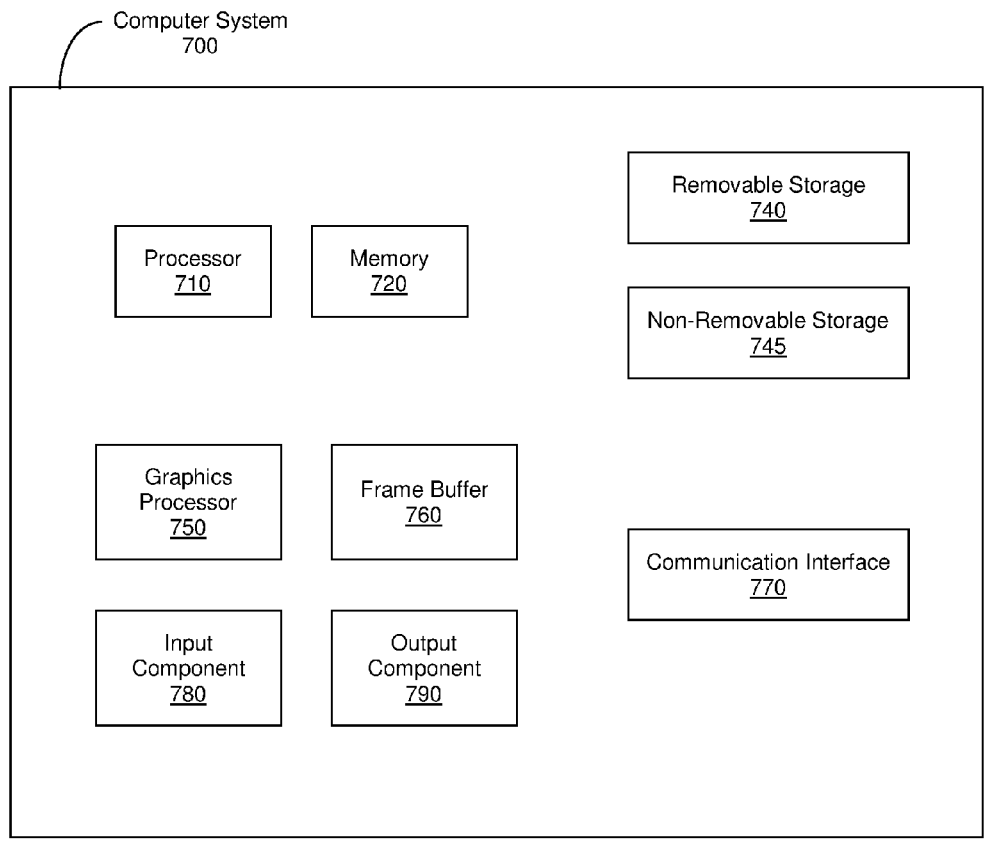
FIG. 7 shows a computer system upon which embodiments may be implemented.

FIG. 7 shows computer system 700 upon which embodiments may be implemented. As shown in FIG. 7, computer system 700 may include processor 710, memory 720, removable storage 740, non-removable storage 745, graphics processor 750, frame buffer 760, communication interface 770, input component 780, and output component 790. One or more embodiments may be implemented by execution of computer-readable instructions or computer-executable instructions that may reside in at least one component of computer system 700 and which may be used as a part of a general purpose computer network. In one embodiment, computer system 700 may be a general-purpose computer system, an embedded computer system, a laptop computer system, a hand-held computer system, a portable computer system and/or portable electronic device, a stand-alone computer system, etc.

In one embodiment, computer system 700 may be used to implement portable electronic device 110, accessory interface 120, at least one accessory (e.g., 130a, 130b, etc.), some combination thereof, etc. And in one embodiment, one or more components of computer system 700 may be disposed in and/or coupled with a housing or enclosure.

In one embodiment, computer system 700 may include at least one processor (e.g., 710) and at least one memory (e.g., 720). Processor 710 may be or include a central processing unit (CPU) or other type of processor. Depending on the configuration and/or type of computer system environment, memory 720 may be or include volatile memory (e.g., RAM), non-volatile memory (e.g., ROM, flash memory, etc.), some combination thereof, etc. Additionally, memory 720 may be removable, non-removable, etc.

In one embodiment, computer system 700 may include additional storage (e.g., removable storage 740, non-removable storage 745, etc.). Removable storage 740 and/or non-removable storage 745 may include volatile memory, non-volatile memory, some combination thereof, etc. Additionally, removable storage 740 and/or non-removable storage 745 may include CD-ROM, digital versatile disks (DVD), other optical storage, magnetic cassettes, magnetic tape, magnetic disk storage, other magnetic storage devices, or any other medium which can be used to store information for access by computer system 700.

As shown in FIG. 7, computer system 700 may communicate with other systems, components, or devices via communication interface 770. Communication interface 770 may be used to implement at least one communication interface (e.g., 112, 122, 123, 133a, 133b, etc.) of one or more components of system 100 in one embodiment.

Communication interface 770 may embody computer-readable instructions, data structures, program modules or other data in a modulated data signal (e.g., a carrier wave) or other transport mechanism. By way of example, and not limitation, communication interface 770 may couple to and/or communicate over wired media (e.g., a wired network, direct-wired connection, etc.) and/or wireless media (e.g., a wireless network, a wireless connection utilizing acoustic, RF, infrared, or other wireless signaling, etc.).

Communication interface 770 may also couple computer system 700 to one or more external input components (e.g., a keyboard, a mouse, a trackball, a joystick, a pen, a voice input device, a touch input device, etc.). In one embodiment, communication interface 770 may couple computer system 700 to one or more external output components (e.g., a display, a speaker, a printer, etc.). And in one embodiment, communication interface 770 may include a plug, receptacle, cable, slot or any other component capable of coupling to and/or communicating with another component, device, system, etc.

Input component 780 may include any component capable of receiving or allowing the input of information. For example, input component 780 may be or include a keyboard, at least one button or key, a mouse, a trackball, a joystick, a pen, a voice input device, a touch input device, another type of input component, etc. Output component 790 may include any component capable of transmitting or allowing the output of information. For example, output component 790 may be or include a display, a speaker, a printer, another type of output component, etc.

As shown in FIG. 7, graphics processor 750 may perform graphics processing operations on graphical data stored in frame buffer 760 or another memory (e.g., 720, 740, 745, etc.) of computer system 700. Graphical data stored in frame buffer 760 may be accessed, processed, and/or modified by components (e.g., graphics processor 750, processor 710, some combination thereof, etc.) of computer system 700 and/or components of other systems, other devices, etc. Additionally, the graphical data may be accessed (e.g., by graphics processor 750) and displayed on an output device coupled to computer system 700 in one embodiment.

In one embodiment, a memory of computer system 700 (e.g., memory 720, removable storage 740, non-removable storage 745, frame buffer 760, some combination thereof, etc.) may be a computer-readable medium (or computer-usable medium, or computer-readable storage medium, etc.) and may include instructions that when executed by a processor (e.g., 710, 750, etc.) implement a method of communicating information (e.g., in accordance with process 400 of FIG. 4), communicating messages between an application and at least one accessory (e.g., in accordance with process 500 of FIG. 5), some combination thereof, etc. And in one embodiment, a computer-readable medium of computer system 700 may be implemented in and/or using at least one die of at least one integrated circuit (e.g., at least one application-specific integrated circuit (ASIC), at least one system-on-a-chip (SOC), at least one programmable system-on-a-chip (PSOC), another type of integrated circuit, etc.).

In the foregoing specification, embodiments have been described with reference to numerous specific details that may vary from implementation to implementation. Thus, the sole and exclusive indicator of what is, and is intended by the applicant to be, the invention is the set of claims that issue from this application, in the specific form in which such claims issue, including any subsequent correction thereto. Hence, no limitation, element, property, feature, advantage, or attribute that is not expressly recited in a claim should limit the scope of such claim in any way. Accordingly, the specification and drawings are to be regarded in an illustrative rather than a restrictive sense.

What is claimed is:

1. A method of communicating information, said method comprising:

establishing a plurality of connections between an accessory interface and a plurality of accessories, wherein each connection of said plurality of connections corresponds to a respective accessory of said plurality of accessories;

establishing a connection between said accessory interface and a portable electronic device, wherein said accessory interface is separate from said portable electronic device;

communicating, via said accessory interface, a first set of messages between said portable electronic device and a first accessory of said plurality of accessories, wherein said communicating said first set of messages further comprises determining that said first set of messages corresponds to said first accessory based on first information encoded in said first set of messages, wherein each message of said first set of messages communicated between said portable electronic device and said accessory interface is formatted in accordance with a first data exchange pattern, wherein each message of said first set of messages communicated between said accessory interface and said first accessory is formatted in accordance with a second data exchange pattern, and wherein said first data exchange pattern and said second data exchange pattern are different; and
communicating, via said accessory interface, a second set of messages between said portable electronic device and a second accessory of said plurality of accessories, wherein said communicating said second set of messages further comprises determining that said second set of messages corresponds to said second accessory based on second information encoded in said second set of messages, and wherein each message of said second set of messages communicated between said portable electronic device and said accessory interface is formatted in accordance with said first data exchange pattern.

2. The method of claim 1, wherein each message of said second set of messages communicated between said accessory interface and said second accessory is formatted in accordance with a third data exchange pattern.

3. The method of claim 2, wherein said first data exchange pattern and said third data exchange pattern are different.

4. The method of claim 2, wherein said second data exchange pattern and said third data exchange pattern are different.

5. The method of claim 1, wherein said communicating said first set of messages further comprises reformatting, using said accessory interface, each message of said first set of messages between said first data exchange pattern and said second data exchange pattern.

6. The method of claim 1, wherein each message of said first and second sets of messages is at most 10 bytes.

7. The method of claim 1, wherein said first information comprises a first channel identifier, wherein a mapping of said first channel identifier to said first accessory is used to determine that said first set of messages corresponds to said first accessory, wherein said second information comprises a second channel identifier, and wherein a mapping of said second channel identifier to said second accessory is used to determine that said second set of messages corresponds to said second accessory.

8. The method of claim 1, wherein each message of said first set of messages and said second set of messages includes: a respective first portion associated with data; a respective second portion associated with a command type; and a respective third portion associated with a channel identifier.

9. The method of claim 8, wherein each message of said first set of messages and said second set of messages further includes: a respective fourth portion associated with a length of said respective first portion; a respective fifth portion associated with a data integrity value; and a respective sixth portion associated with command metadata.

10. The method of claim 1, wherein said first set of messages comprises a first message and a second message, wherein said first message is associated with a command to perform at least one operation, and wherein said second message is associated with a response to said command.

11. The method of claim 1, wherein said communicating said first set of messages further comprises communicating a message selected from a group consisting of: a command initiated using a graphical user interface rendered by said portable electronic device; and data input using a graphical user interface rendered by said portable electronic device.

12. An accessory interface comprising:
a first communication interface configured to establish a connection with a portable electronic device, wherein said first communication interface is further configured to receive, from said portable electronic device, a first message and a second message;
a second communication interface configured to establish a plurality of connections with a plurality of accessories, wherein each connection of said plurality of connections corresponds to a respective accessory of said plurality of accessories; and
a processor configured to:
access, from said first communication interface, said first and second messages formatted in accordance with a first data exchange pattern;
responsive to a first determination that a first accessory of said plurality of accessories corresponds to said first message, provide said first message formatted in accordance with a second data exchange pattern to said second communication interface for communication to said first accessory, wherein said first data exchange pattern and said second data exchange pattern are different; and
responsive to a second determination that a second accessory of said plurality of accessories corresponds to said second message, provide said second message to said second communication interface for communication to said second accessory.

13. The accessory interface of claim 12, wherein said processor is further configured to:
provide said second message formatted in accordance with a third data exchange pattern to said second communication interface for communication to said second accessory.

14. The accessory interface of claim 13, wherein said first data exchange pattern and said third data exchange pattern are different.

15. The accessory interface of claim 13, wherein said second data exchange pattern and said third data exchange pattern are different.

16. The accessory interface of claim 13, wherein said processor is further configured to:
reformat said first message from said first data exchange pattern to said second data exchange pattern; and
reformat said second message from said first data exchange pattern to said third data exchange pattern.

17. The accessory interface of claim 12, wherein each message of said first and second messages is at most 10 bytes.

18. The accessory interface of claim 12, wherein said processor is configured to perform said first determination by:
accessing a first channel identifier from said first message; and
using a mapping of said first channel identifier to said first accessory to determine that said first message corresponds to said first accessory.

19. The accessory interface of claim 12, wherein each message of said first and second messages includes: a respective first portion associated with data; a respective second portion associated with a command type; and a respective third portion associated with a channel identifier.

20. The accessory interface of claim 19, wherein each message of said first and second messages further includes: a respective fourth portion associated with a length of said respective first portion; a respective fifth portion associated with a data integrity value; and a respective sixth portion associated with command metadata.

21. The accessory interface of claim 12, wherein said first message is associated with a command to perform at least one operation.

22. A system comprising:
a portable electronic device; and
an accessory interface, wherein said accessory interface is separate from said portable electronic device, and wherein said accessory interface comprises:
a first communication interface configured to establish a connection with said portable electronic device, wherein said first communication interface is further configured to receive, from said portable electronic device, a first message and a second message;
a second communication interface configured to establish a plurality of connections with a plurality of accessories, wherein each connection of said plurality of connections corresponds to a respective accessory of said plurality of accessories; and
a processor configured to:
access, from said first communication interface, said first and second messages formatted in accordance with a first data exchange pattern;
responsive to a first determination that a first accessory of said plurality of accessories corresponds to said first message, provide said first message formatted in accordance with a second data exchange pattern to said second communication interface for communication to said first accessory, wherein said first data exchange pattern and said second data exchange pattern are different; and
responsive to a second determination that a second accessory of said plurality of accessories corresponds to said second message, provide said second message to said second communication interface for communication to said second accessory.

23. The system of claim 22, wherein said processor is further configured to:
provide said second message formatted in accordance with a third data exchange pattern to said second communication interface for communication to said second accessory.

24. The system of claim 23, wherein said first data exchange pattern and said third data exchange pattern are different.

25. The system of claim 23, wherein said second data exchange pattern and said third data exchange pattern are different.

26. The system of claim 23, wherein said processor is further configured to:
reformat said first message from said first data exchange pattern to said second data exchange pattern; and
reformat said second message from said first data exchange pattern to said third data exchange pattern.

27. The system of claim 22, wherein each message of said first and second messages is at most 10 bytes.

28. The system of claim 22, wherein said processor is configured to perform said first determination by:
accessing a first channel identifier from said first message; and
using a mapping of said first channel identifier to said first accessory to determine that said first message corresponds to said first accessory.

29. The system of claim 22, wherein each message of said first and second messages includes: a respective first portion associated with data; a respective second portion associated with a command type; and a respective third portion associated with a channel identifier.

30. The system of claim 29, wherein each message of said first and second messages further includes: a respective fourth portion associated with a length of said respective first portion; a respective fifth portion associated with a data integrity value; and a respective sixth portion associated with command metadata.

31. The system of claim 22, wherein said first message is associated with a command to perform at least one operation.

* * * * *